US008244792B2

(12) United States Patent
Boaz et al.

(10) Patent No.: US 8,244,792 B2
(45) Date of Patent: Aug. 14, 2012

(54) APPARATUS AND METHOD FOR INFORMATION RECOVERY QUALITY ASSESSMENT IN A COMPUTER SYSTEM

(75) Inventors: Yoav Boaz, San Mateo, CA (US); Guy Loewenberg, Ramat Gan (IL); Rami Katz, Tel Aviv (IL)

(73) Assignee: EMC (Benelux) B.V., S.A.R.L., R.C.S. (Luxembourg) (LU)

( * ) Notice: Subject to any disclaimer, the term of this patent is extended or adjusted under 35 U.S.C. 154(b) by 1191 days.

(21) Appl. No.: 11/403,745

(22) Filed: Apr. 12, 2006

(65) Prior Publication Data
US 2006/0288183 A1    Dec. 21, 2006

Related U.S. Application Data

(63) Continuation-in-part of application No. PCT/IL03/00828, filed on Oct. 13, 2003, now abandoned.

(51) Int. Cl.
G06F 15/16    (2006.01)

(52) U.S. Cl. ........ 709/200; 709/217; 709/229; 707/650; 707/999.008; 707/999.202

(58) Field of Classification Search .................. 709/217, 709/223; 711/162; 707/204, 10
See application file for complete search history.

(56) References Cited

U.S. PATENT DOCUMENTS

| 5,371,807 A | 12/1994 | Register et al. ............... 382/159 |
| 5,386,545 A | 1/1995 | Gombos, Jr. et al. ......... 707/204 |
| 5,454,099 A | 9/1995 | Myers et al. ...................... 714/6 |
| 5,495,607 A | 2/1996 | Pisello et al. .................. 707/10 |
| 5,557,747 A | 9/1996 | Rogers et al. ................. 709/223 |
| 5,652,897 A | 7/1997 | Linebarger et al. ............... 704/4 |
| 5,754,782 A | 5/1998 | Masada ........................ 709/213 |
| 5,812,748 A | 9/1998 | Ohran et al. ........................ 714/4 |
| 5,854,754 A | 12/1998 | Cabrera et al. ..................... 703/2 |
| 5,857,102 A | 1/1999 | McChesney et al. ......... 427/131 |
| 5,857,208 A * | 1/1999 | Ofek ...................... 707/999.202 |
| 6,029,166 A | 2/2000 | Mutalik et al. ..................... 707/3 |
| 6,065,062 A | 5/2000 | Periasamy et al. ............. 709/242 |
| 6,067,545 A | 5/2000 | Wolff ............................... 707/10 |
| 6,161,111 A | 12/2000 | Mutalik et al. ................ 707/205 |
| 6,199,074 B1 | 3/2001 | Kern et al. ..................... 707/204 |
| 6,266,781 B1 | 7/2001 | Chung et al. ...................... 714/4 |
| 6,266,784 B1 | 7/2001 | Hsiao et al. ........................ 714/6 |
| 6,304,980 B1 | 10/2001 | Beardsley et al. ................ 714/6 |
| 6,360,330 B1 | 3/2002 | Mutalik et al. .................... 714/4 |
| 6,363,411 B1 | 3/2002 | Dugan et al. ................... 709/202 |
| 6,366,987 B1 | 4/2002 | Tzelnic et al. ................. 711/162 |
| 6,490,598 B1 | 12/2002 | Taylor ........................... 707/204 |

(Continued)

FOREIGN PATENT DOCUMENTS

WO    01 06368 A1    1/2001

*Primary Examiner* — Yves Dalencourt
(74) *Attorney, Agent, or Firm* — Muirhead and Saturnelli, LLC

(57) ABSTRACT

An apparatus and method for information recovery quality assessment in a computing environment is disclosed. This includes a group of inter-related software modules and associated data structures that analyze and assess the recoverability of the network data through the data protection configuration setup and a previously performed data protection process. It examines in a comprehensive manner the recoverability perspective across a pre-defined data protection domain, such as a computer network with an organization. The results of the examination provide for the display of inconsistencies of data protection configuration and previously performed data protection processes that consequently result in problems of recovering the network objects in an appropriate manner.

36 Claims, 15 Drawing Sheets

U.S. PATENT DOCUMENTS

| | | | |
|---|---|---|---|
| 6,496,949 B1 | 12/2002 | Kanevsky et al. | 714/47 |
| 6,539,426 B1 | 3/2003 | Meek et al. | 709/223 |
| 6,543,004 B1 | 4/2003 | Cagle et al. | 714/15 |
| 6,574,704 B1 | 6/2003 | Ishida | 711/114 |
| 6,578,121 B1 | 6/2003 | Schutzman | 711/162 |
| 6,625,623 B1 * | 9/2003 | Midgley et al. | 707/204 |
| 7,243,103 B2 * | 7/2007 | Murphy et al. | 707/10 |
| 7,457,959 B2 * | 11/2008 | Margolus et al. | 713/176 |
| 7,509,357 B2 * | 3/2009 | Lohn et al. | 707/204 |
| 7,529,901 B2 * | 5/2009 | Hirakawa et al. | 711/162 |
| 2002/0194535 A1 | 12/2002 | Largman et al. | 714/36 |
| 2003/0051109 A1 | 3/2003 | Cochran | 711/162 |
| 2003/0065762 A1 | 4/2003 | Stolorz et al. | 709/223 |
| 2003/0115432 A1 | 6/2003 | Biessener et al. | 709/238 |

* cited by examiner

IRQA - MICROSOFT INTERNET EXPLORER

ANOMALOUS/REJECTED OBJECTS | SUMMARY:

| NAME | MAX DURATION | MAX FAILURES | MAX SEVERITY | REASON FOR FAILURE |
| --- | --- | --- | --- | --- |
| D:USER2 | 1 DAYS | 2 | 1 | LAST RUN FAILED |
| F:USER3 | 1 DAYS | 4 | 1 | FILE SIZE IS ZERO |
| C/: | | | | |
| DOCS | 1 DAYS | 2 | 1 | CLIENT IS DISABLED |
| PROGS | 2 DAYS | 2 | 4 | DIRECORY IS MSSING |

FIG14.

APPARATUS AND METHOD FOR INFORMATION RECOVERY QUALITY ASSESSMENT IN A COMPUTER SYSTEM

CROSS REFERENCE TO RELATED APPLICATIONS

This application is a continuation-in-part of International application No. PCT/IL2003/000 828, with an international filing date of Oct. 13, 2003, now abandoned.

BACKGROUND OF THE INVENTION

1. Field of the Invention

The present invention relates generally to data protection management in computing systems. More particularly the present invention relates to an apparatus and method for assessing the quality of an information recovery process.

2. Discussion of the Related Art

The importance of backing up data and keeping it safe and easily retrievable has never been more obvious. As corporate data continues to grow exponentially, losing access to critical data for even just an hour can cost a company million of dollars. Lately, a plurality of more stringent rules and regulations have been disclosed that are requiring companies to keep accessible copies of their electronic records, including electronic mail (e-mail) and Instant Messaging (IM), for as long as twenty years.

Since the beginning of computing, companies have been protecting their most valuable data by backing it up in a regular manner. The traditional focus has been on the basic backing up of the data and the associated storage thereof. Presently the focus is increasingly on the ability of a company to restore the backed up data, in a reliable, rapid, and accurate manner. Although presently, several technologies exist for rapid recovery, the real issue of reliable and accurate recovery is yet not sufficiently addressed.

Today, Information Technology (IT) routinely deals with distributed, complex, and dynamic computer networks to which frequent updates are applied on the daily basis. The responsibilities for protecting data by backing up the multitude of objects constituting the networks are typically spread out among several IT managers and the data protection process may be performed by the utilization of diverse data protection software, data protection scripts and external data protection schedulers. Surveys indicate that the majority of the managers are not sufficiently confident concerning the quality of the data protection processes used. The information regarding which portions of the operational data were actually saved and which portions were ignored or skipped during a data protection process performed via the utilization of commercial off-the-shelf data protection software, is woefully inadequate. Thus, users are unpleasantly surprised when they find out all too frequently that data is missing during a critical recovery process. The problem exists as a result of the current aspects of the existing data protection software. Presently, data protection technologies typically focus on the data protection process rather than the recovery process, although it is widely realized that "protecting the data by backing up" is only the means for the real objective of "recovering the data".

It would be easily perceived by one with ordinary skills in the art that a new apparatus and method is needed that focuses on the problem of "what cannot actually be recovered" versus "what wasn't protected correctly".

SUMMARY OF THE PRESENT INVENTION

One aspect of the present invention regards an apparatus for the assessment of the quality of an information recovery process. The apparatus is designed to be installed in and to operate in a computer network that includes an at least one computing device, an at least one storage object, an at least one data protection server device, and at least one data protection storage device. The apparatus comprises the elements of: a combined data protection policy builder component to create a central and integrated data protection rule repository of an organization associated with the computer network, a network computer-level level analyzer component to compare an at least one characteristic of the at least one network computer with an at least one data protection input parameter of an at least one data protection rule and with an at least one data protection result output data of an at least one data protection server index, a network storage object-level analyzer component to compare an at least one characteristic of an at least one network storage object with an at least one data protection input parameter of an at least one data protection rule and with an at least one data protection result output data of an at least one data protection server index, an anomalous objects and rejected objects identifier component to identify anomalous and/or rejected objects in accordance with the results generated by the network computer-level analyzer component and the network storage object-level analyzer component, an anomalous objects and rejected objects analyzer component to provide information regarding the at least one anomalous and the at least one rejected object in response to an at least one query submitted by an at least one user, a combined data protection policy table to store an at least one data protection rule and an at least one data protection schedule, an anomalous object table to store the at least one identified anomalous network computer and the at least one identified anomalous storage object, and a rejected object table to store the at least one identified rejected storage object.

According to the first aspect of the invention the anomalous or rejected objects are storage objects that cannot be recovered through the process of data protection or storage objects that cannot be recovered according to the at least one data protection rule or storage objects that are inconsistent with the at least one data protection rule. The data protection policy builder component performs an analysis on the at least one data protection rule.

The apparatus further comprises an rejected objects analyzer component to provide information associated with the at least one anomalous or the at least one rejected object in response to an at least one query submitted by an at least one user, data protection server index extractor component to obtain data protection result data from the at least one data protection server; a network computer extractor component to scan the network and generate a list including an at least one network computer; a network storage object extractor component to retrieve the computer network and generate a list including an at least one network storage object; an data protection server rules extractor component to obtain the at least one data protection rule associated with the at least one data protection server; an external data protection scheduler extractor component to obtain the at least one data protection schedule associated with the at least one data protection rule; and a user data protection rules generator component to create an at least one user-defined data protection rule. The apparatus can further include a data protection log extractor component to obtain data protection log data generated by the at least one data protection server during the performance of a data protection process; a views generator component to create an at least one view of the anomalous or rejected object or data protection rule inconsistencies or irrecoverable storage objects or storage objects that are not consistent with a data protection policy, in response to an at least one query submitted by an at least one user. The apparatus can also include a report generator component to create and format at least one report based on the at least one view; and a job scheduler component to manage the execution of an at least one job defined for the operation of the apparatus. Additional elements in the apparatus include a network computer table to store at least one list of an at least one aspect of the at least one network computer; a network storage object table to store at least one list of an at least one aspect of the at least one network storage object. The apparatus further comprises the elements of a user data protection rule table to store the data protection rules defined by an at least one user of the apparatus; a user table to store a list of an at least one aspect of the at least one user; a data protection server index to store data protection results output data generated during the execution of a data protection process managed and controlled by the at least one data protection server; a queries table to store a list of an at least one query; and a user queries table to store a list of the at least one query submitted by the at least one user.

The data protection rules repository table comprises the elements of a data protection rule identifier that identifies uniquely a data protection rule; a data protection rule type; a client identifier; a data protection server identifier to identify a data protection server associated with the data protection rule; a save set object; a data protection group name; a data protection group start time; a group operation mode; a data protection schedule name; a schedule period; a schedule day; and a creation date. The apparatus further comprising a views generator component to create an at least one view of the at least one data protection rules repository table. The rejected objects table comprises the elements of a data protection server identifier to identify the data protection server responsible for the performance of a data protection process during which an anomaly associated with the rejected object was generated; a storage object name to identify the rejected storage object; a computer name to identify the rejected computer or identify the computer associated with the rejected storage object; a storage object system identifier; a pathname indicating the location of the rejected object; an object size to indicate the physical size of the rejected object; a reason for failure code to indicate the type of failure via which the rejected object was generated; a process identifier; a date identifier; and a data protection rule identifier. The storage object is an object existing within the computer network and is a candidate for backup. The computing device is a client computing device or a server computing device. A storage object is any one of the following list: a file, a directory, a file system, a storage device, a virtual storage device, a client computer or a server computer.

A second aspect of the present invention regards a method for the assessment of the quality of an information recovery process. The method is designed to be implemented and to operate in a computer network including an at least one computing device, an at least one storage object, an at least one data protection server device, and at least one data protection storage device. The method comprises the steps of: verifying an at least one data protection rule by comparing the data protection input parameters of the at least one data protection rule and examining the results of the comparison for inconsistencies, storing the results of the verification process on a storage device, building a combined data protection policy table based on the at least one data protection rule and on an at least one data protection schedule, performing a network computer-level analysis by scanning the computer network, locating an at least one network computer and collecting the characteristics of the computer, performing a network storage object-level analysis by collecting the characteristics of an at least one network storage object associated with the at least one network computer, storing the results of the network computer-level analysis on a storage device, and storing the results of the network storage object analysis on a storage device.

The computer-specific data comprises information about a computer linked to the computer network. The object-specific data comprises information about an object located within a computer linked to the computer network. The step of comparing further comprises extracting a data protection server index from an at least one data protection server and comparing the data protection server index with the contents of the at least one data protection rule, with the at least one network storage object, and with the at least one network computer-specific data.

The method comprises the steps of storing on a storage device the results of the at least one data protection rule comparison, the results of the network computer-level analysis, and the results of the network storage-level analysis, and the step of generating an at least one user data protection rule. The method further comprises the step of extracting an at least one data protection server log. The method further comprises generating an at least one view for or at least one report in response to an at least one query submitted by an at least one user comprising an at least one back rule or an at least one inconsistency or an at least one object that cannot be recovered.

The combined data protection policy table comprises an at least one data protection rule associated with an organization operating the computer network. The network computer-level analysis includes the comparison of the results of an information about at least one network computer with data protection input parameters of an at least one data protection rule and with a data protection result output data included in an at least one data protection server index. The network storage object-level analysis includes the comparison of information about the at least one network storage object with data protection input parameters of an at least one data protection rule and with a data protection result output data included in an at least one data protection server index. The results of the network computer-level analysis and the network storage object-level analysis are anomalous objects or rejected objects.

An anomalous or rejected object is an storage object that cannot be recovered by a data protection process or an storage object that cannot be recovered by a data protection process defined by the at least one data protection rule or an storage object is inconsistent with information comprising the at least one data protection rule or the data protection input parameters of the at least one data protection rule. The storage object is an object existing within the computer network and is a candidate for backup.

The data protection policy table comprises at least one data protection rule and at least one back up policy derived from at least one data protection server and at least one data protection policy derived from an external data protection scheduler or at least one user manual script or at least one local or global directive. The data protection policy table comprises at least one data protection rule wherein each at least one data protection rule defines at least one rule to apply to at least one storage object associated with the computer network during a data protection process whereby a viewpoint of the data protection rules and policies in the organization are shown.

BRIEF DESCRIPTION OF THE DRAWINGS

The present invention will be understood and appreciated more fully from the following detailed description taken in conjunction with the drawings in which:

FIGS. 12, 13, 14 illustrate exemplary graphical user interface-based display screens utilized for communication between the proposed apparatus and a user, in accordance with a preferred embodiment of the present invention.

DETAILED DESCRIPTION OF THE PREFERRED EMBODIMENT

Figure 1:
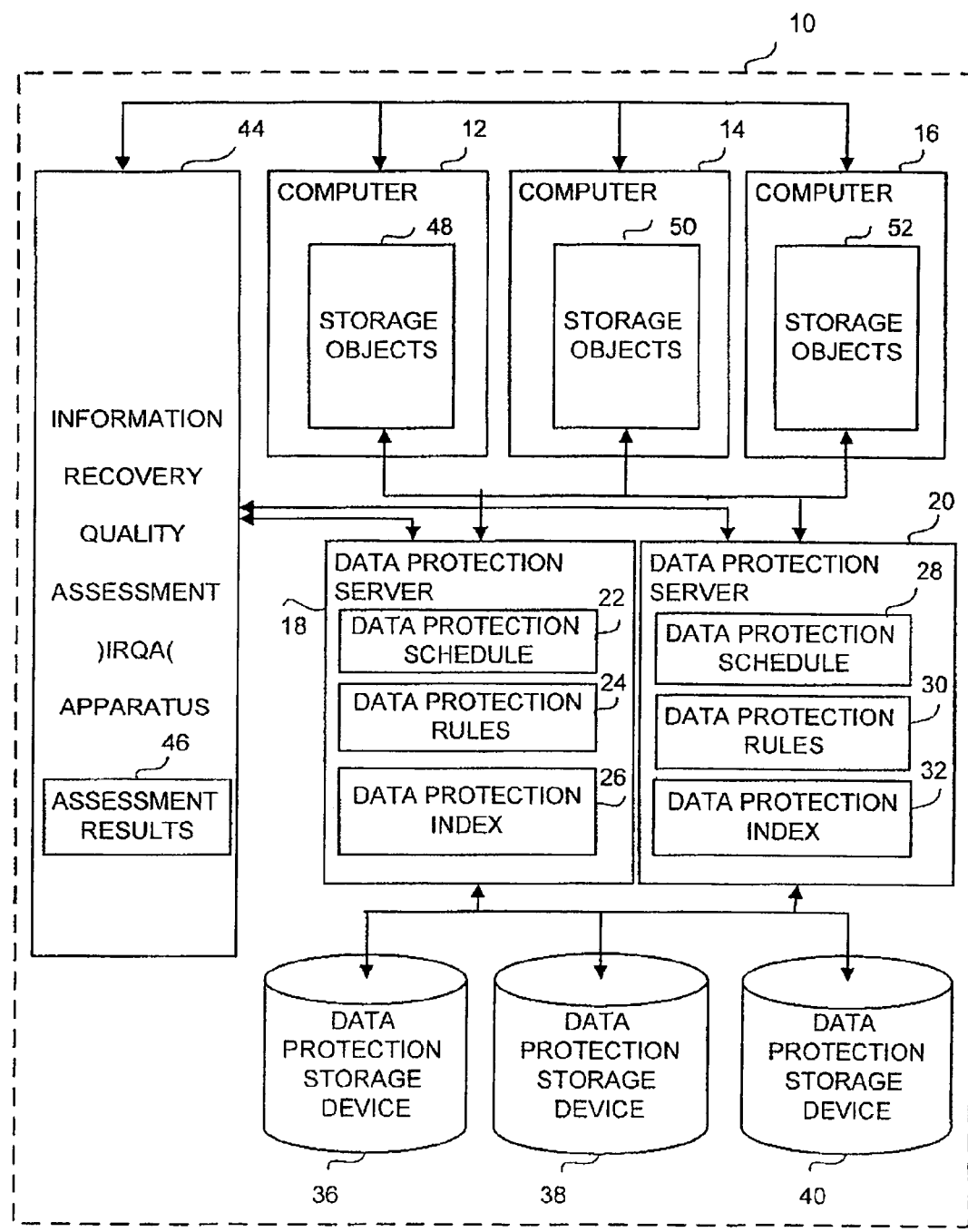
FIG. 1 is a schematic illustration of a computing and communications environment in which the apparatus and method proposed by the present invention could operate.

An apparatus and method for information recovery quality assessment in a computing and data communication environment is disclosed. The information recovery quality assessment (IRQA) apparatus and method comprises a set of modules and associated data structures operative in the analysis and assessment of a previously performed data protection process.

The term "bbackup" refers to the copying of data for the purpose of having an additional copy of an original source. If the original data is damaged or lost, the data may be copied back from that source, a process which is known as "data recovery" or restore. The "data" in question may be either data as such, or stored program code, both of which are treated the same by the data protection or backup software.

There are several traditional backup methods that can be executed on a computing system and each of these backups can use disks or tapes as the primary data protection storage device. The most common traditional backup methods are: a) full backup, b) incremental backup, c) differential backup, d) replication backup (mirroring or point-in-time), e) tape-based backup, f) disk-based backup, g) Redundant Array of Independent Disks (RAID)-based backup, h) snapshot backups and the like. An advanced type of backup scheme is typically referred to as Continuous Data Protection (CDP) where computer data is backed up by automatically saving a copy of every change made to that data, essentially capturing every version of the data that the user saves.

In order to emphasize that the present invention could be implemented in association with the entire range of the existing backup methods, the backup-related copying process will be referred to in the text of this document as "data protection process". The entire set of hardware and software elements supporting and constituting the backup method are typically referred to by terms that include the specific "backup" characterizer, such as in "backup server", "backup index", "backup rules", "backup input parameter" and the like. In the text of this document the specific characterizer "backup" will be replaced by the generic characterizer "data protection". Thus, the above elements will be referred to herein after in a consistent manner as "data protection server", "data protection index", "data protection rules", "data protection input parameter" and the like.

The above-mentioned information recovery quality assessment (IRQA) apparatus and method is designed to be implemented for comprehensively examining the performance of a previously performed data protection process across a pre-defined data protection domain, such as a computer network or a sub-network associated with an organization. The proposed method generates a central data protection policies repository based on diverse data protection software, pre-defined user scripts, pre-defined data protection schedulers, and the like. The method accesses the specific data procession process domain, such as a computer network or a sub-network associated with an organization, collects storage platform (computer) data and storage object data and generates one or more lists comprising storage platform identifications and associated sets of storage object identifications accompanied by relevant storage platform and storage objects characteristics. A storage object is an object that exists in the network, such as a file, a directory, a file-system, a storage device, a virtual storage device, a computer (also referred to as a client or a server), and the like, and is defined as a candidate for a data protection process. The method further collects data protection process output control data, such as information extracted from data protection server indexes, from data protection server log files, and the like, and suitably structures the collected data into one or more lists. The method performs verification on the data protection server rules, on the user data protection rules, and any other data protection rules operational across the network or networks and associated with diverse data protection technologies. The method further performs an analysis of the network objects both on the storage platform (computer) level and on the storage object level. The structured lists of the data protection input parameters, the storage platforms, and the storage objects are compared with the data protection process output control parameters in order to locate discrepancies and inconsistencies, generated potentially during the various stages of the data protection process as a result of, for example, erroneous parameters, errors in one or more of the stages of the data protection process, such as during the opening of a storage object, during the registration of the data protection control output parameters, and the like The analysis and the comparison of the parameters lists, storage platform lists, and storage objects lists with the data protection process output control information is further operative in locating and identifying non-recoverable objects. Non-recoverable objects are defined as storage objects that cannot be recovered via the operation of any conventional restore process consequent to known or unknown data protection-related situations, conditions or states, such as a missing data protection schedule definition, a storage object having a size of zero (an empty file), an inconsistency between the size of the actual storage object residing in the network and the storage object size as defined in the data protection control parameters, a storage object that never has been backed up, and the like. Non-recoverable objects are further defined as storage objects that cannot be recovered in accordance with the data protection rules set by the Enterprise Data Protection Policy (EDPP). EDPP is the central repository of the data protection policies of an organization. For example, a non-recoverable object could be an object that the last data protection process operated thereon had been failed, the last data protection copy of the object was removed or destroyed, the data protection volume was re-labeled, the data protection process was not completed due to time restraints, incorrect operational procedures were activated, and the like. Non-recoverable objects could further include storage objects that may be incorrectly configured in the system in respect to the data protection definitions and data protection activities. In the preferred embodiment of the invention, non-recoverable objects are conceptually divided into anomalous objects and rejected objects. Rejected objects are defined as non-recoverable objects that can not be processed by the application for various reasons, such as the inability of the application to handle the format of the object, and the like. Anomalous objects are defined as non-recoverable objects that can be processed by the application. The results of the analysis are saved into one or more specific tables that are stored on a storage device in order to allow one or more users the submission of specific queries, and the generation of relevant reports designed and developed for the purpose of displaying to the user the various discrepancies, inconsistencies, anomalous objects, and rejected objects.

Referring now to FIG. 1 the computing and communications environment 10 is a computer network in which data is backed up to specific data protection storage device. The backing up of the data is referred to as the data protection process. The backed up data is stored on the data protection storage device for a pre-determined or non-limited length of time. When required the backed up data is restored from the data protection storage device i.e., copied back from the storage device preferably to the original location in the computer network. The restoring of the data is referred to as the restore process. The restore process is typically performed for purposes of information recovery when for various reasons the original network objects were damaged and the data stored therein was entirely or partially lost. Typically, both the data protection process and the restore process are performed by the operation of one or more data protection servers associated with respective data protection technologies. It would readily perceived by one with ordinary skills in the art that the quality of the restore process depends directly on the quality of the data protection process, where quality refers to the reliability, the accuracy, and the integrity of the data protection process. Thus, in order to assess the quality of the information recovery the quality of the previously performed data protection process should be examined. The examination should include a validation of the data protection setup, the data protection configuration, the data protection policies, as well as the operational environment in order to detect potential voids and inconsistencies.

Still referring to FIG. 1 the network 10 includes a first computing platform 12, a second computing platform 14, a third computing platform 16, a first data protection storage device 36, a second data protection storage device 38, a third data protection storage device 40, a first data protection server 18, a second data protection server 20, and an Information Recovery Quality Assessment (IRQA) apparatus 44. The first computer platform 12 includes a first storage objects 48, the second computer platform 14 includes a second storage objects 50, and the third compute platform 16 includes a third storage objects 52. The computer platforms 12, 14, 16 are preferably computing devices having data storage, data processing and data communication capabilities. The platforms 12, 14, 16 include a memory device (not shown), a processing device (not shown), an input device (not shown), an output device (not shown), a communication device (not shown) and one or more storage devices (not shown). Note should be taken that the platforms 12, 14, 16 could include additional devices. The network can include additional remote or local computing devices and platform. The storage devices are preferably hard disks utilized for the storage of operational or historical data, control data, software programs, such as applications, utilities, and the like. The data and programs are typically stored in specific data structures, such as the storage objects 48, 50, and 52. The platforms 12, 14, 16 could be mainframe computers, personal computers, or other computing devices with the appropriate hardware configuration and the appropriate capabilities. The first data protection server 18 and the second data protection server 20 are a set of software modules and associated control tables. The servers 18, 20 could be installed on dedicated computing platforms or could be co-located with other data or programs in a single platform. The data protection servers 18, 20 are to perform a data protection process that is to copy the data from the storage objects 48, 50, 52 to pre-defined data protection storage device. The first data protection server 18 includes data protection rules files 24, and a data protection index control output file 26. Data protection index 26 is commonly referred to as a data protection server index. Data protection index 26 could be alternatively referred to as a data protection server table or a data protection server database. The second data protection server 20 includes data protection rules files 30, and a data protection index control output file 32. The data protection rule file may include a data protection schedule and other information. The data protection servers 18, 20 operate independently, that is each server could perform a data protection process handling a different data protection domain controlled by a different data protection rules, and generating a different data protection index. When, in accordance with pre-defined data protection rules stored in the data protection rules control input table 24. During the data protection process, the relevant data files stored within the storage objects 48, 50, 52 are selectively copied to the data protection storage device 36, 38, 40. Subsequent to the completion of a storage object-specific copy the server 18 generates an entry in the data protection index 26. Note should be taken that subsequent to the completion of the data protection process the data protection index 26 should a set of entries associated with the set of successfully backed up storage objects. The storage objects being backed up are copied to the data protection storage device 36, 38, 40. The storage device 36, 38, 40 are conventional data protection media, such as, for example, automated tape storage systems, local hard disks, remote network storage device, and the like. Persons skilled in the art will appreciate that additional computing systems, data protection servers, and storage device devices can be implemented in accordance with the present invention whether locally, remotely, across one or more networks, and also across wide area networks such as the Internet.

Still referring to FIG. 1 where a restore process is initiated for data recovery purposes the server 18 is typically activated manually. The restore process in performed in accordance with the entries of the data protection index. For each entry in the data protection index 26 the server 18 extracts the relevant parameters and attempts to perform an object restore copy operation. Thus, when during the previously performed data protection process a specific storage object copy operation had been failed, as a result, for example, of a storage object access failure, a storage object open failure, storage object read errors, storage object write errors, severe malfunctioning of the system, operating errors, inconsistent data protection rules, and the like, the relevant storage object will not be restored by the copy operation. It would be easily perceived that a corrupted data protection index 26, such as, for example, the lack of a specific entry associated with a backed up storage object, could effect the performance of the restore process in a negative manner.

Still referring to FIG. 1 the IRQA apparatus 44 is a set of software modules for the analysis of the network storage objects, in the comparison with the data protection input parameters in association with network storage objects with the data protection index, and the building of one or more lists containing entries indicative of discrepancies, inconsistencies, and non-recoverability associated with problematic objects that are candidates to backup. The IRQA apparatus 44 is implemented on a computer platform (not shown). Note should be taken that the IRQA apparatus 44 could be co-located on the same platform with diverse other applications and databases. The IRQA apparatus 44 generates a one or more assessment results tables 46 that could be used for subsequent queries, reports, and additional data mining operations, in order to determine whether a required restore process based on the data protection index generated by a prior data protection process, is reliable for subsequent activation. The results files 46 could be further utilized for pinpointing specific data protection-related and therefore recovery-related problems, such as, for example, locating permanently open storage objects, detecting non-functional or deactivated hardware devices, determining that specific storage objects, storage or system administration procedures are non-synchronized, deficient or incomplete, and the like. The network described herein above can be spread within a single location or across several locations located in various areas and connected via local network such as a LAN network, or a distributed network such as a WAN through various means of communications.

Figure 2:
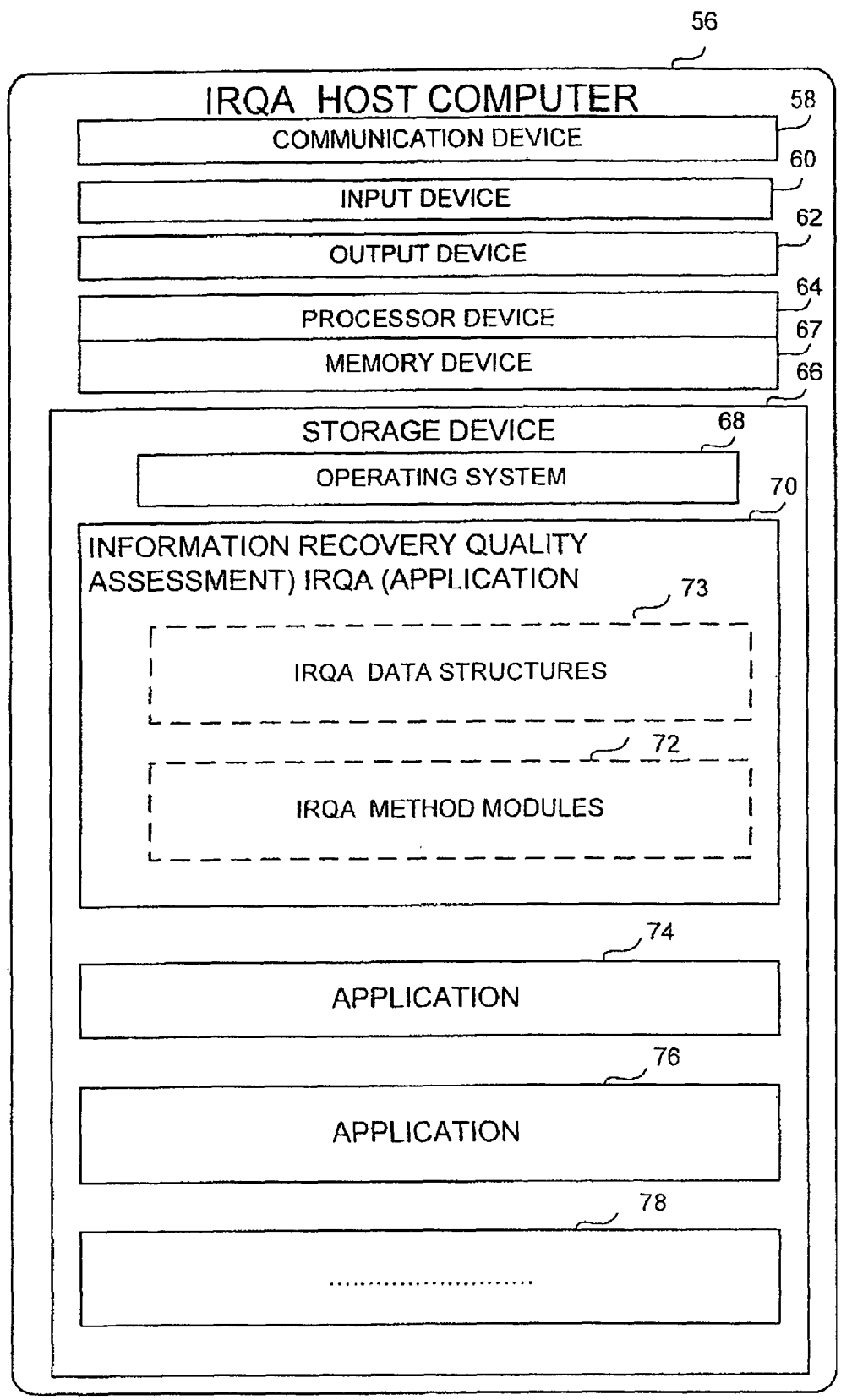
FIG. 2 is a schematic block diagram of a computing device hosting the proposed apparatus and associated method, in accordance with a preferred embodiment of the present invention.

Referring now to FIG. 2 in the preferred embodiment of the invention the IRQA apparatus 44 of FIG. 1 is installed on and operates the method thereof from an IRQA host-computing device 56. Device 56 could be any suitable computing device, such as a mainframe computer, a mini-computer, a desktop computer, or a laptop computer and the like having data processing, data storage, and data communication capabilities and linked appropriately to a computer network or networks of an organization or enterprise. Device 56 includes a communication device 58, an input device 60, an output device 62, a microprocessor device 64, and a memory device 67, and a storage device 66. Device 56 could include additional devices. Communication device 58 is typically a modem or a Network Interface Card (NIC). Device 58 is functional in the linking of the computer to a data communications network. Input device 60 typically provides the means for communication between the computer and a user thereof. Device 60 is typically a keyboard operating in association with a pointing device (mouse). Device 58 could also be a more advanced hardware device, such as a light pen, a microphone for voice input, and the like. Output device 62 is typically a video display unit equipped with a display screen. Device 62 could also be a printer unit. Memory device 67 is an electronic holding place for instructions and data that the computer's microprocessor can rapidly access. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer. Microprocessor device 64 is designed to perform arithmetic and logic operations that make use of small number-holding areas called registers. Typical microprocessor operations include adding, subtracting, comparing two numbers, and fetching numbers from one area to another. These operations are the result of a set of instructions that is part of the microprocessor design. Storage device 66 is the physical medium that holds the much larger amounts of data that could not be loaded into RAM in entirety and may not be immediately needed there. Typical storage devices include hard disks, floppy disks, CD-ROM, RAID, and the like. In the preferred embodiment of the invention device 66 is a hard disk that holds an operating system 68, and an IRQA application 70. Device 66 further stores a first independent software application 74, a second independent software application 76, and additional independent applications 78. Note should be taken that device 66 could store additional software programs, such as communication utilities, user interface modules, and the like. IRQA application 70 includes a set of IRQA method modules 72 and a set of IRQA data structures 73. Operating system 68 is the program that, after being initially loaded into the computer by a boot program, manages all the other programs in a computer. The other programs are called applications or application programs. The application programs make use of the operating system by making requests for services through a defined application program interface (API). In addition, a user can interact directly with the operating system through a user interface such as a command language or a graphical user interface (GUI). IRQA application 70 is operative in the assessment of information recovery quality prior to a data restore process. IRQA modules 72 are a set of logically inter-related computer programs that execute the application 70 in association with the IRQA data structures 73. IRQA data structures 73 are a set of data tables storing information specifically relevant to the recovery quality assessment process. A more detailed description of the IRQA modules 72 and the associated IRQA data structures 73 will be provided herein below in association with the following drawings. Applications 74, 76, and 78 are applications independent of the IRQA application 70. Applications 74, 76, 78 are sets of logically inter-related computer programs that could be operative in the running of diverse processing typical to a computing environment. Applications 74, 76, 78 are presented herein to emphasize that the IRQA application 70 could be co-located with diverse other applications on a single computing platform.

Figure 3:
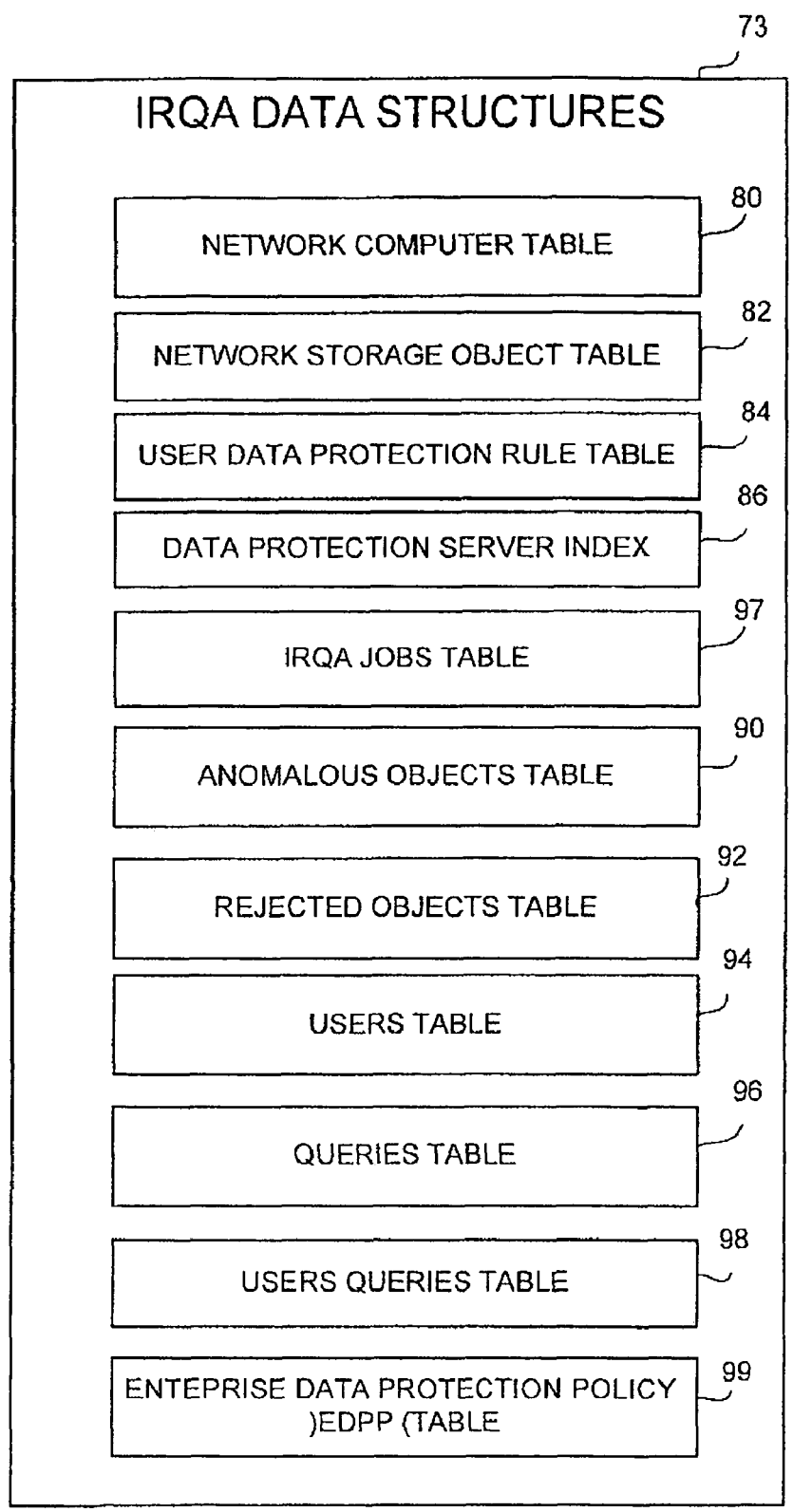
FIG. 3 is a simplified block diagram illustrating an exemplary set of data files functional in the operation of the proposed apparatus and method, in accordance with a preferred embodiment of the present invention.

Referring now to FIG. 3 the IRQA data structures can include a network computer table 80, a network storage object table 82, a user data protection rule table 84, a data protection server index 86, an anomalous objects table 90, a rejected objects table 92, a users table 94, a queries table 96, a users queries table 98, an enterprise data protection policy (EDPP) table 99, and a jobs table 97. Network computer table is generated by the IRQA application 70 of FIG. 2 during the scanning and the analysis of the computer network or sub-network in order to locate, extract and store a list of computers connected to the network. Network storage object table 82 is generated by the application 70 during the scanning and the in-depth analysis of the computer network or sub-network in order to identify, extract and store a list of identified network storage objects associated with the previously identified network computers in the network. User data protection rule table 84 stores one or more user data protection rules concerning the performance of a data protection process. Table 84 is built and maintained locally by a suitably authorized data protection administration professional. Application 70 utilizes table 84 as control input for the generation of the EDPP table 99. Data protection server index 86 is a data repository that holds indexes of data the backing up of which was successfully completed. The data held by the data protection server index 86 is the actual and accurate data available for recovery. Index 86 is generated by the data protection server 18, 20 of FIG. 1 during the performance of a data protection process in order to store storage object-specific handling information. Anomalous objects table 90 is generated by the IRQA application and stores a list of non-recoverable objects detected during the performance of the information recovery quality assessment process. Rejected objects table 92 is built during the performance of the data protection process by the data protection server 18, 20 of FIG. 1. Rejected objects table 92 stores a list of objects that cannot be handled by the application as a result of diverse reasons, such as the inability of the application to recognize the format of the object. Users table 94 is a list of authorized users that enables access for the users defined therein to the system. User queries table 98 and Queries table 96 store query parameters. An authorized user generates Table 98 and 96 during the submission of a query. EDPP table 99 is a central repository for the data protection rules. EDPP table 99 is constructed during the performance of the first stage of the IRQA application and includes a combined list of the data protection rules, data protection schedules, and data protection policies within the enterprise. EDPP table 99 provides a complete and genuine inventory of the entire range of data protection rules defined across the organization covering the different data protection methods utilized by various data protection technologies. IRQA jobs table 97 holds a set of IRQA job-specific record where each record stores a pre-defined set of IRQA execution parameters as defined by a user.

Note should be taken that the data structures described herein above are exemplary only and non-limiting. In other preferred embodiments of the present invention one or more tables could be added, some tables could be combined while yet other tables could be eliminated altogether. The functionality of the tables could also differ. The limits of the present invention are defined only by the attached claims.

Figure 4:
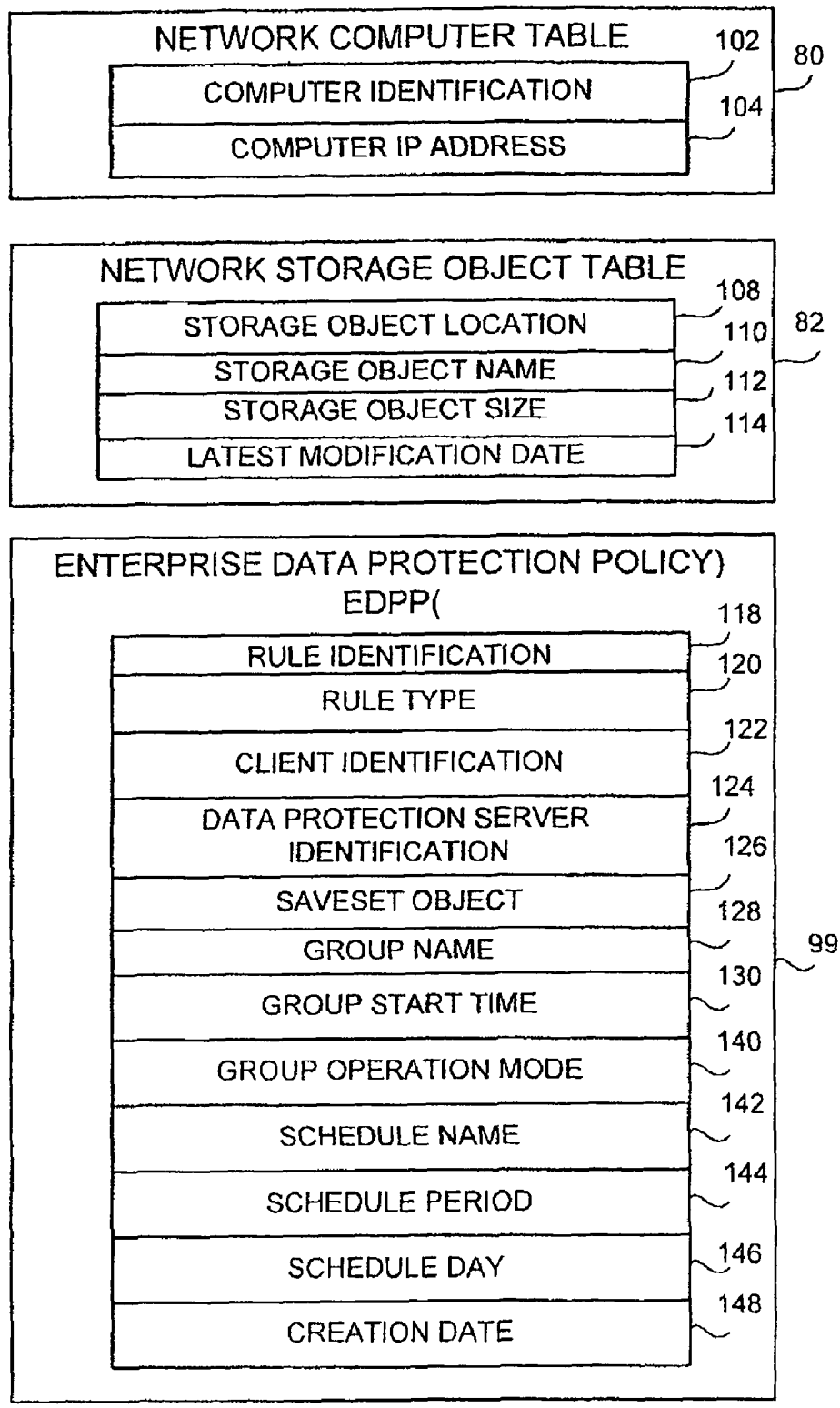
FIGS. 4, 5, 6, and 7 show the more detailed structures of the data files, in accordance with a preferred embodiment of the present invention.

Referring now to FIG. 4 the network computer table 80 holds a set of records where each record is associated with a computer the identification and the characteristics of which were extracted from the network or a sub-network (or networks or sub-networks) of an organization or enterprise. A specific computer-specific record can include relevant characteristics of a network computer, such as computer identification 102, a computer IP address 104, and the like. Network storage object table 82 includes a set of records where each record is associated with a storage object the identification and the characteristics of which were extracted from the network or the sub-network of the organization. A storage object could be a directory, a file, a file-system, a storage device, a computer, and the like. The network storage object record includes the following fields: a storage object locator 108, a storage object name 110, a storage object size 112, and a latest modification date of the object 114. EDPP table 99 is the central repository of the data protection rules operative across the organization and across the entire range of data protection technologies used. The EDPP table 99 constructed from a) data protection rules and policies from various operative data protection software b) data protection rules that although use the operated software are defined externally in different methods, such as external data protection schedulers, user scripts, local directives, and the like. EDPP table 99 is further constructed from data protection rules that do not use any data protection software and therefore are operated independently via manual scripts, and the like. EDPP table 99 holds a set of records where each record is associated with a data protection rule, such as a data protection server rule, a user data protection rule, or any other data protection rule used to control any of the data protection processes performed by diverse data protection technologies utilized by the organization. A typical record in the EDPP table 118 comprises a data protection rule identification 118, a data protection rule type 120, a client identification 122, a data protection server identification 124, a save-set object 126 (also referred to as the computer pathname of the object), a group name 126, a group starting time 130, a group operation mode code 140 (e.g. active mode or inactive mode), a schedule identifier 142, a schedule period 144, a schedule day 146, and a creation date 148.

The data structures and the constituent fields described herein above are exemplary only and non-limiting. In other preferred embodiments of the present invention one or more fields could be added, some fields could be combined while yet other fields could be eliminated altogether. The functionality of the fields could also differ. Fields could be transferred among tables. The limits of the present invention are defined only by the attached claims.

Figure 5:
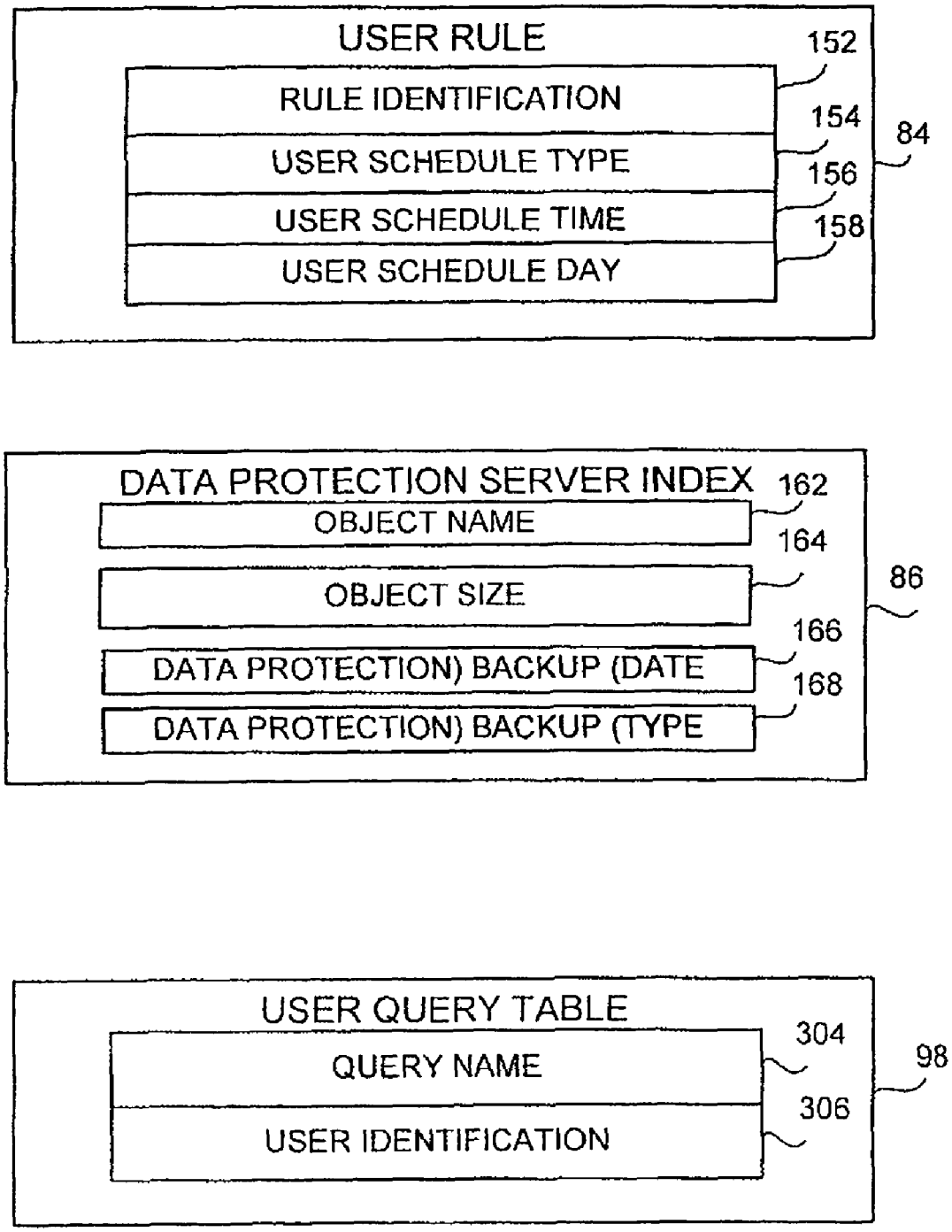

Referring now to FIG. 5 the user data protection rule table 84 typically stores a set of records where each record holds data concerning a distinct user data protection rule. A user data protection rule record includes the following fields; a user data protection rule identifier 152, a user schedule type 154, a user schedule time 156, and a user schedule day 158. Data protection server index 86 stores a set of records where each record includes information concerning the backing up of a specific storage object. The record includes the following fields; an object identifier 162, an object size 164, a data protection date 166, and a data protection type identifier 168. User query table 98 consists of user query records generated by the submission of a request by a user for a specific query. Each user query record in table 98 is associated with a user query and includes a query name field 304, and a user identification field 306.

The data structures and the constituent fields described herein above are exemplary only and non-limiting. In other preferred embodiments of the present invention one or more fields could be added, some fields could be combined while yet other fields could be eliminated altogether. The functionality of the fields could also differ. Fields could be transferred among tables. The limits of the present invention are defined only by the attached claims.

Figure 6:
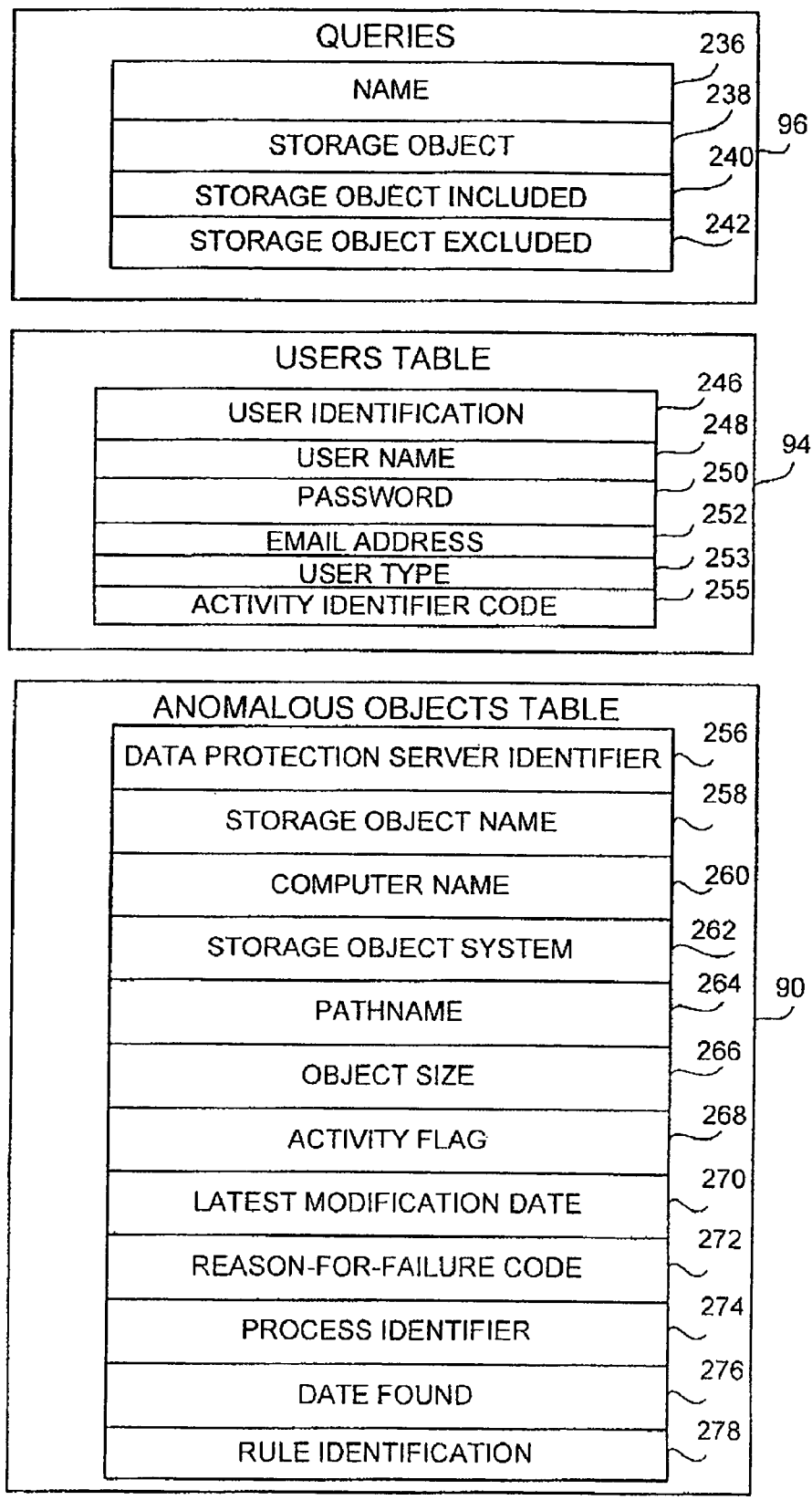

Referring now to FIG. 6 the queries table 96 holds a set of records associated with a query submitted for execution by a user. A record in the table 96 typically includes the following fields: query name or query identification 236, the storage object queried 238, a storage object included in the query 240, and a storage object excluded from the query 242. Users table 94 can hold a set of user-specific records. A user record can include the following fields: user identification 246, user name 248, user password 250, email address 252, user type 253, and a user activity code 255. Anomalous objects table 90 holds a set of records where each record is associated with non-recoverable object or an object that cannot be restored or cannot be restored safely, or cannot be restored such as to affect a proper recovery. An anomalous object record can include the following fields: data protection server identifier 256, a storage object name 258, a computer name 260, a file-system 262, a path name 264, a storage object size 266, an activity indicator code 268, a latest modification date 270, a reason-for failure indicator code 272, a process identifier 274, an object-found date 276, and a rule identifier 278.

The data structures and the constituent fields described herein above are exemplary only and non-limiting. In other preferred embodiments of the present invention one or more fields could be added, some fields could be combined while yet other fields could be eliminated altogether. The functionality of the fields could also differ and fields could be transferred among tables. The limits of the present invention are defined only by the attached claims.

Figure 7:
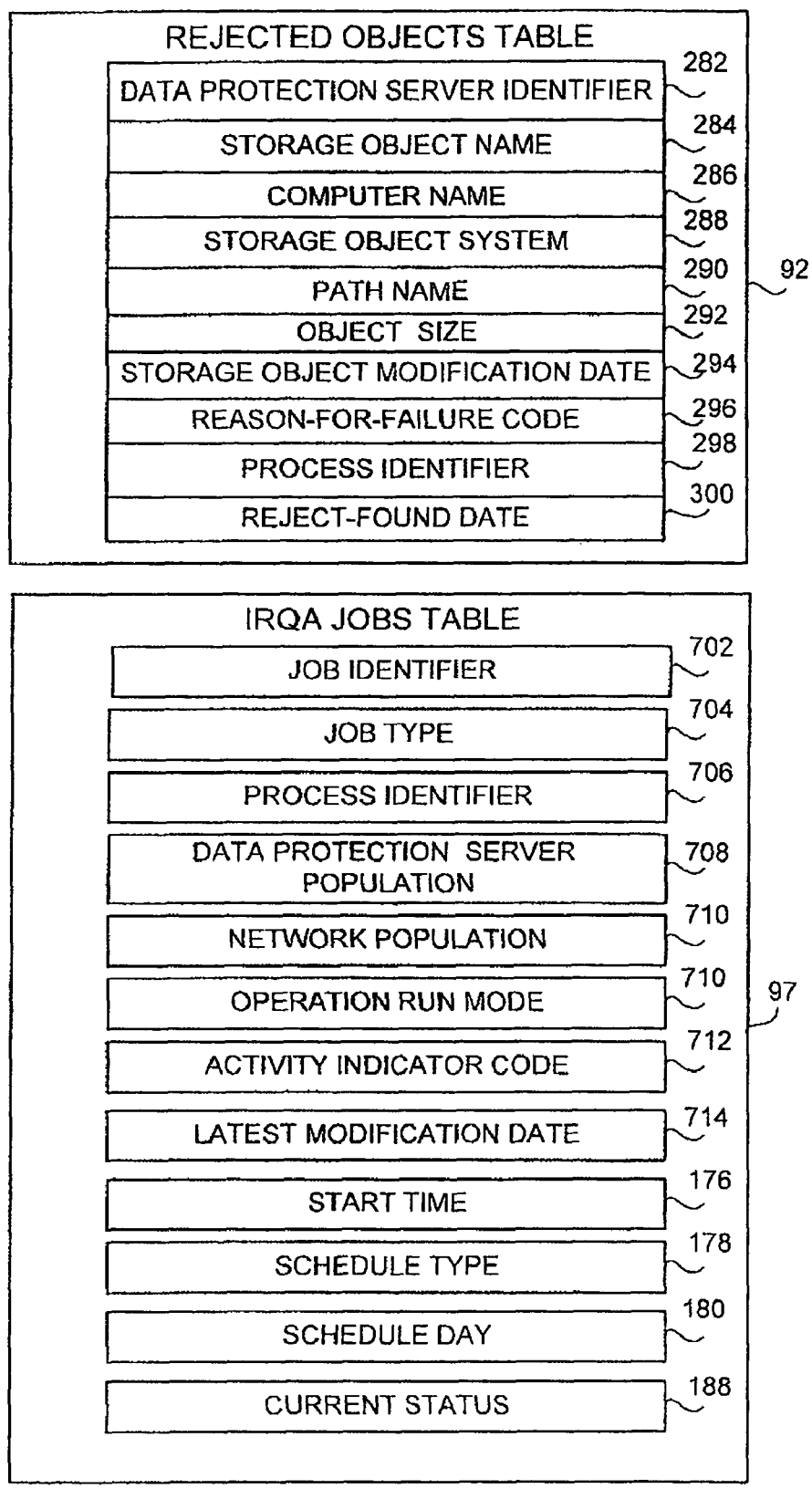

Referring now to FIG. 7 the rejected storage objects table 92 holds a set of records associated with a rejected storage object. A record in the table 92 includes the following fields: a data protection server identifier 282, a storage object name 284, a computer name 286, a file-system 288, a pathname 290, a storage object size 292, an object modification date 284, a reason-for-failure indicator code 296, a process identifier 298, and an object-found date 300. Jobs table 97 holds a set of job-specific records where each record includes the following fields: a job identifier 702, a job type 704, a process identifier, 706, a data protection server population definer 708, a network population definer 710, an operation run mode identifier code 712, a job start time 176, a schedule type 178, a schedule day 180, a current status indicator code 188, and a latest modification date 714. The data structures and the constituent fields described herein above are exemplary only and non-limiting. In other preferred embodiments of the present invention one or more fields could be added, some fields could be combined while yet other fields could be eliminated altogether. The functionality of the fields could also differ and fields could be transferred among tables. The limits of the present invention are defined only by the attached claims.

Figure 8:
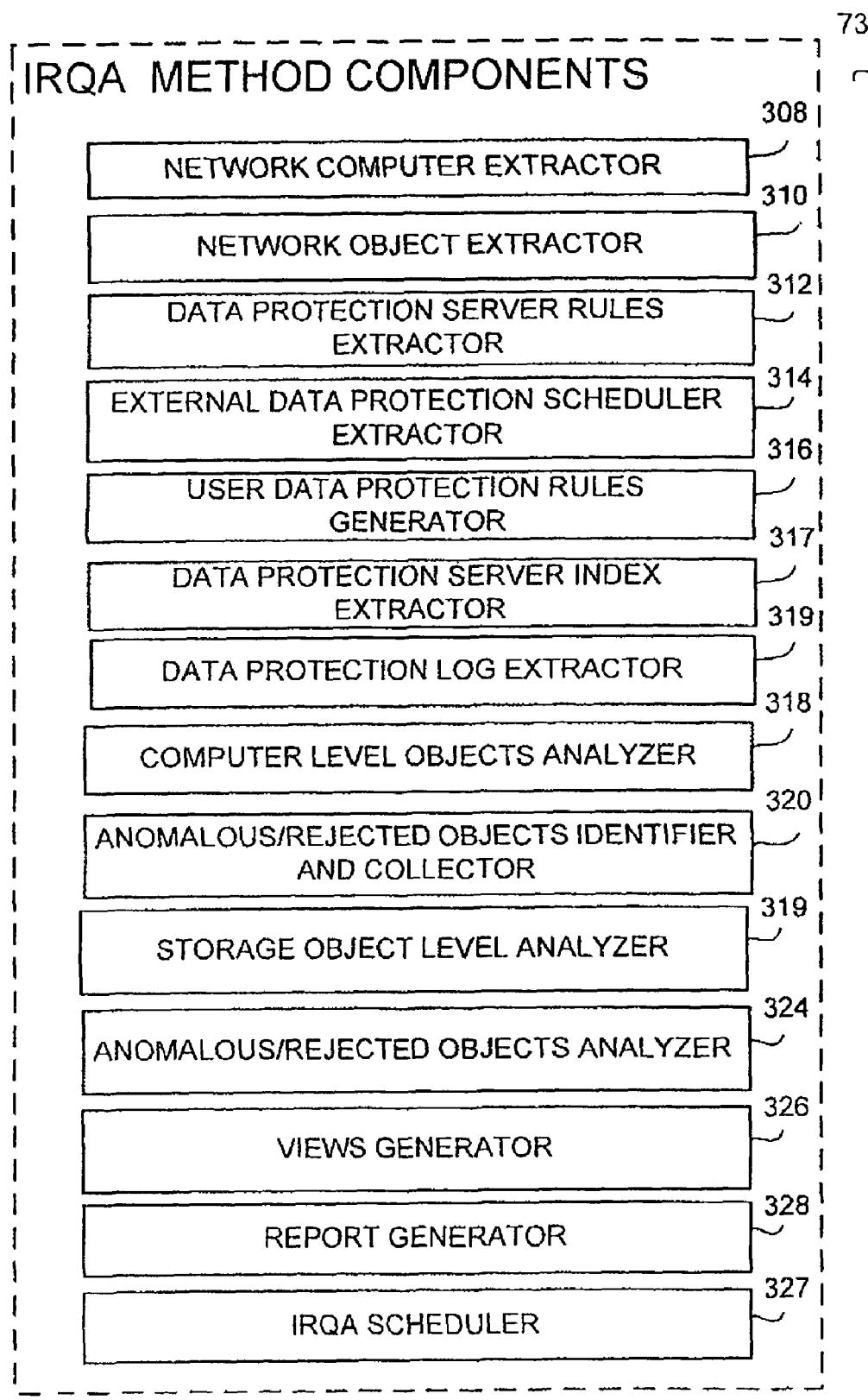
FIG. 8 is shows the functional method modules of the proposed apparatus and method, in accordance with a preferred embodiment of the present invention.

Referring now to FIG. 8 the IRQA method components 73 include a set of logically inter-related computer programs operative in the execution of the application. The components 73 include: a network computer extractor 308 to extract computers from a network, a network storage object extractor 310 to extract storage objects from a network, a data protection server rules extractor 314 to access a data protection server and obtain the data protection server rules, an external data protection scheduler extractor 31, a user data protection rules generator 316 to locate and obtain user data protection rules 316, a data protection server index extractor 317 to locate and obtain information concerning the data that was backed up into the data protection storage device, a data protection log extractor 319 to locate and obtain information regarding the associated data protection processes, a computer level object analyzer 318 to perform a three-way comparison involving the EDPP table, the data protection server index and the extracted computers list, an anomalous/rejected objects analyzer 320, a storage object level analyzer 319 to perform a three-way comparison involving an extracted storage object table, an extracted data protection server index, and an EDPP table, a views generator 326 to create structured displays based on user-submitted queries, an IRQA scheduler 327, and a report generator 328 to generate structured reports based on user-submitted demands. The storage object level analyzer 319 further performs a generic recovery logic analysis the parameters thereof are defined on the storage object, application backup type and a key which defines a storage object level. The recovery logic allows for the introduction of additional rules that are configured to validate the ability to recover. For each key the analysis activates specific recovery logic. An exemplary logic could include three control fields: a) required, b) backup type, and c) dependency type. The value of the "required" field could be one of the following values: a) "YES" for backup is required in the current backup type and level, b) "NO" for backup is not required in the current backup type and level, and c) "EXPLICITLY REQUIRED" for should be backed up although there is a directive defined. The values of the "backup field" could be one of the following: a) "DOWN" for the storage object should be backed up when the specific storage object is down, b) "BACKUP MODE" for the storage object should be backed up when the specific storage object in backup mode or c) "ANY" for the storage object could be in any mode when backup is done. The value of the "dependency type" field could be one of the following: a) "WITH" for the storage object to bee backed up together with the following dependency component, b) "WITHOUT" for the storage object to be backed up and the following dependency component is not needed to be backed up, and c) "EXTRA" for additional storage objects should be backed up when the specific storage objects is backed up. The IRQA methods further include a Recovery Advisor module for a recovery advisor method (not shown). The Recovery Advisor module (not shown) enables the user to focus on images and recovery points created for a specific time frame. The Recovery Advisor (not shown) provides several useful options to a user: a) to request to display all the images for one or more specific storage objects or applications, b) to request a display of all the images of one or more specific storage objects or application prior to a specific point-in-time, and c) to request a display of all the images of one or more specific storage objects or application after a specific point-in-time. The recovery advisor method (not shown) will display the list of recovery points, such as a set of images in accordance with the user's criteria, from which the user could select a specific recovery point. Thus, the user will not be required to check all the backups and replications in order to formulate a recovery plan.

The components and the functionality thereof described herein above are exemplary only and non-limiting. In other preferred embodiments of the present invention one or more components could be added, some components could be combined while yet other components could be eliminated altogether. The functionality of the components could also differ.

Figure 9:
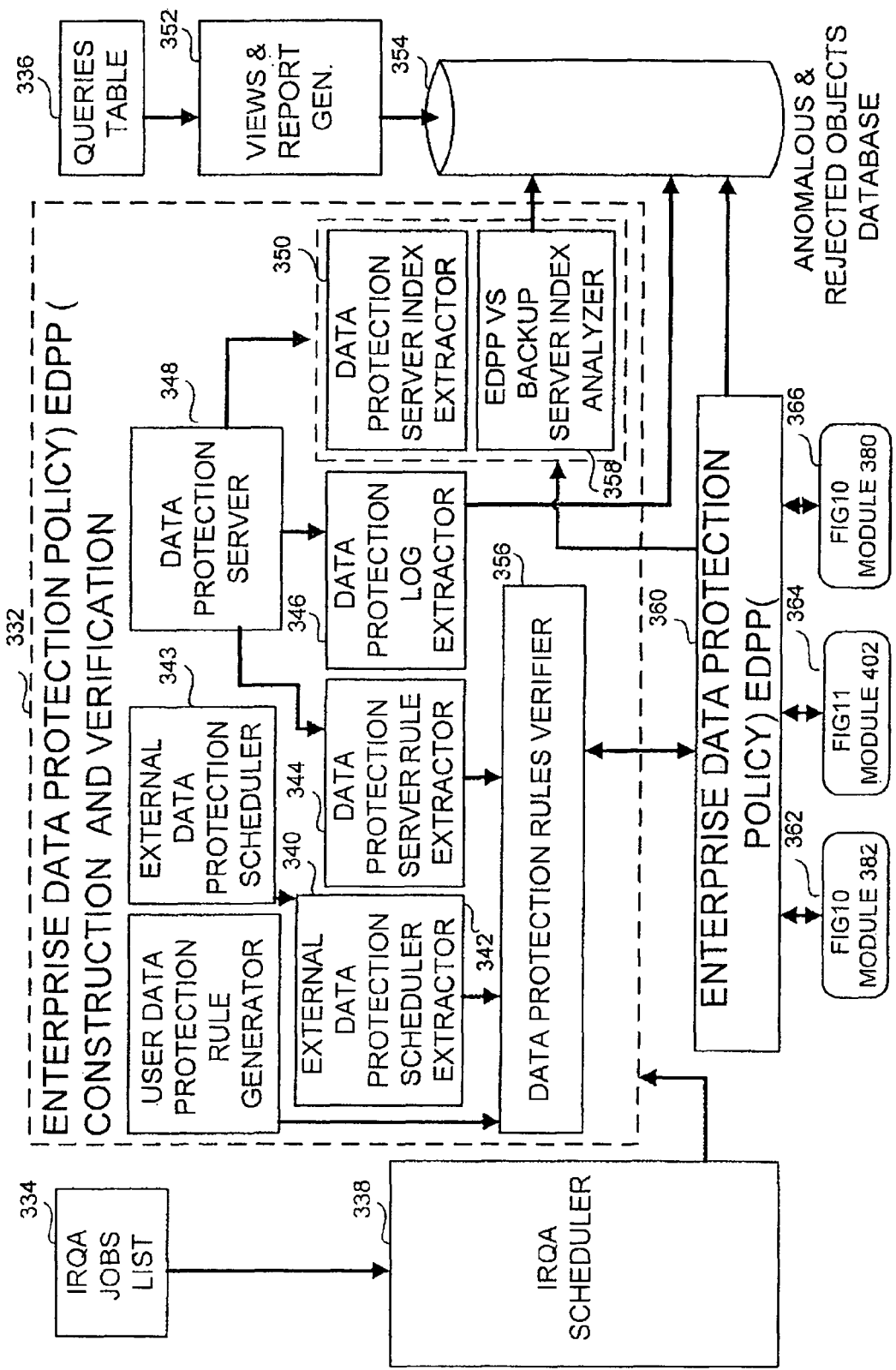
FIGS. 9, 10, and 11 are simplified block diagrams that illustrate in combination the configuration of the proposed apparatus and method, in accordance with a referred embodiment of the present invention.

Referring now to FIG. 9 that illustrates the configuration of the proposed apparatus and system operative in the performance of the first executable stage of the IRQA application. The first stage of the IRQA application is the Enterprise Data Protection Policy Construction and Verification stage 332. The function of stage 332 is to generate an enterprise data protection policy table which holds a combined set of data protection rules collected from the different data protection rule tables utilized by the data protection system. A further function of stage 332 is to identify inconsistencies in the data protection rules, in the data protection server index, and in the data protection logs. The structure and parameters of the enterprise data protection policy table were described herein above in association with FIG. 4. The configuration described in association with FIG. 9 includes an IRQA jobs list 334, an IRQA scheduler component 338, a user data protection rule generator 340, an external data protection scheduler 343, a data protection server 348, an external data protection scheduler extractor module 342, a data protection server rule extractor module 344, a data protection log extractor module 346, a data protection rules verifier module 356, a data protection server index extractor module 350, an EDPP vs. data protection server index analyzer module 358, an enterprise data protection policy (EDPP) table 360, a queries table 336, a views and report generator component 352, and a anomalous/rejected objects database 354. The IRQA scheduler 338 controls the execution of the IRQA application. The scheduler 338 obtains the IRQA jobs list 334 and in accordance with job execution parameters stored therein, loads and activate the IRQA application. The detailed structure and the number and type of parameters stored in the IRQA job list were described herein above in association with FIG. 7. The job type parameter determines which of the stages of the application will be executed. If the job type parameter includes the code that indicates that the execution includes the construction of an EDPP and the verifying of the data protection rules then the first stage of the application is executed. Accordingly, the data protection rules are generated in the user data protection rule generator 340 and the external data protection scheduler 343, and the data protection server 348. The rules are collected by the external data protection scheduler extractor 342, and the data protection server rule extractor 344. The collected data protection rules are obtained by the data protection rules verifier 356 in order to examine the rules and determine the validity thereof. Diverse validity checks could be performed on the data protection rules, such as checking the date fields for valid date formats, checking the existence of a rule, and the like. The various data protection rules could be further examined for internal consistency and coherence. The rules could be also examined in order to identify inter-rules conflicts, variances, inconsistencies, and the like. The data protection server index is extracted from the data protection server 348 by the data protection server index extractor 350. The collected data protection rules and the extracted data protection index are analyzed by the EDPP vs. the data protection server index analyzer 358. In the first stage of the processing the analysis involves validation of certain parameters within the records of the collected data protection rules as well as comparing the data protection rules to the information provided by the data protection server index. The performance of the validation and checking processes provides the capability of identifying potential incoherency regarding one or more data protection rules, such as, for example, the want of operable data protection schedule definitions, or the presence of incompletely defined/generated data protection rules for one or more clients and/or storage objects, and the like. In addition, the analysis is designed to detect discrepancies between a planned data protection recorded in the EDPP table and the actual data protection information stored in the data protection server index. The analysis and verification process are attained by comparing information collected by the apparatus of the present invention as is detailed above and below. For example, if a data protection rule indicates that a specific scheduled data protection process is defined at a specific date that is earlier than the date of the analysis, and if the data protection server index does not indicate the a data protection process has been performed at that specific date, then an inconsistency result is generated. The results of the analysis are sent to and stored on the anomalous/rejected objects database 354. In addition, the data protection server log is extracted from the data protection server 348 by the data protection log extractor 346 and sent for storage to the anomalous/rejected objects database 354. Inconsistencies can include information about objects that cannot be recovered, information about objects that cannot be recovered according to data protection input parameters or data protection rules and objects that cannot be recovered because of inconsistencies in the data protection policies of the organization. Additional inconsistencies will become apparent from the examples shown. The queries table 336 is generated by users submitting queries concerning the results of the analysis, the results of the rules verification, the content of the data protection log file, and the like. The queries are executed via the generation of views by the view generator 352. A query could include a demand for the generation of a report. The report is created by the report generator 352. Both the views and the reports utilize data extracted from the anomalous/rejected objects database 354. Thus, the fist stage of the IRQA verifies the combined data protection rules, analyzes the combined data protection rules of the system and the data protection server index in order to create a list of inconsistencies without accessing the network.

The configuration, the constituent elements and the functionality thereof described herein above are exemplary only and non-limiting. In other preferred embodiments of the present invention the configuration could be modified, one or more elements could be added, and some elements could be combined while yet other elements could be eliminated altogether. The functionality of the elements could also differ. The data pathways linking the elements could be further modified.

Figure 10:
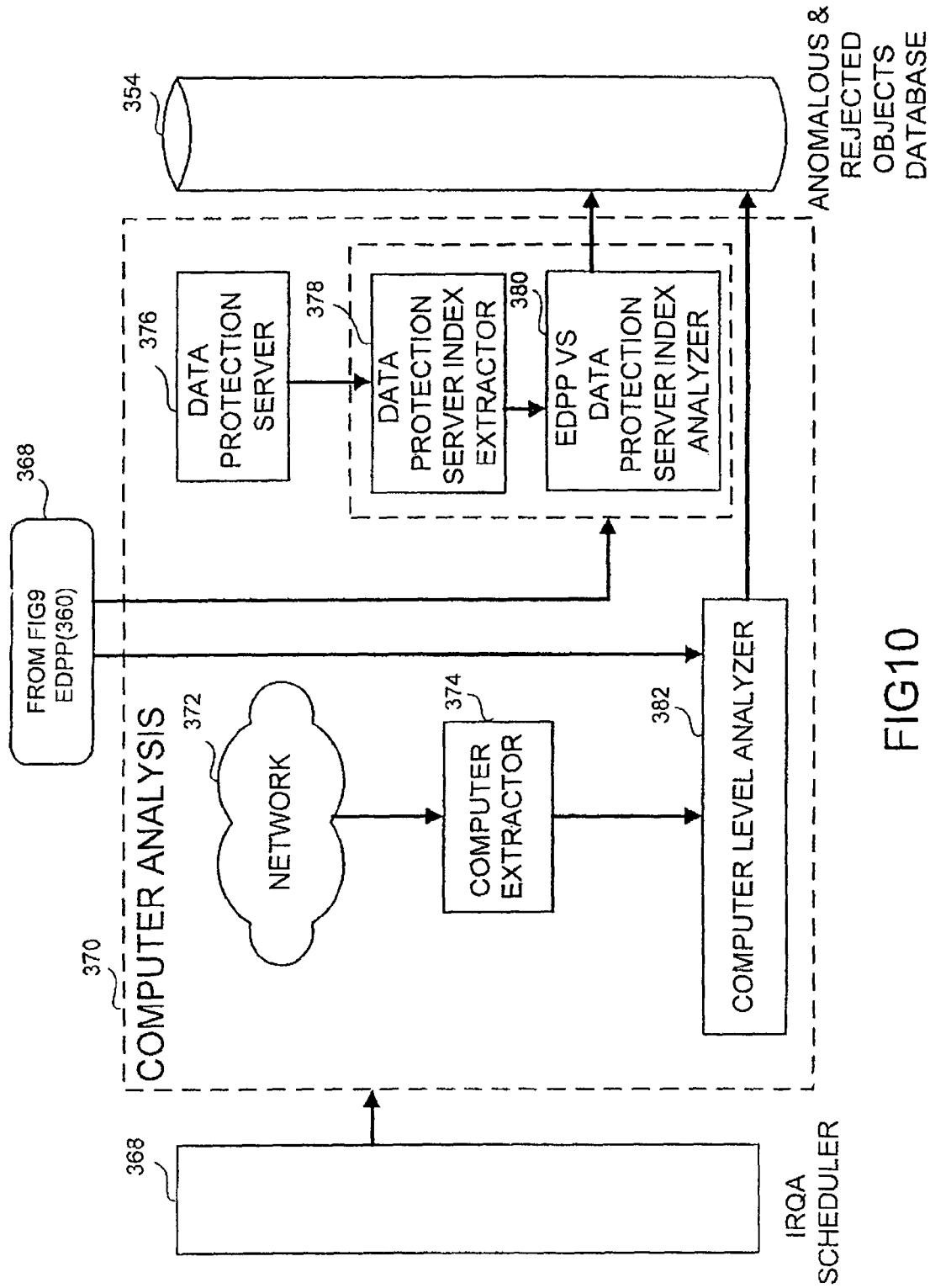

Referring now to FIG. 10 that illustrates the configuration of the proposed apparatus and system that is operative in the performance of the second executable stage of the IRQA application. The second stage of the IRQA application includes a computer analysis 370. The function of stage 370 is to scan the network to enable the exclusive extraction and the collection of the computers from the network, to extract the data protection server index, and to analyze the list of extracted computers and the data protection server index versus the EDPP generated in the first stage. The configuration described on FIG. 10 includes an IRQA scheduler 338 that is equivalent to the IRQA scheduler 334 of FIG. 9, a computer network 372, a computer extractor 374, a data protection server 376, a data protection server index extractor 378, a computer level analyzer 382, an EDPP vs. data protection server index analyzer, and a anomalous/rejected objects database 354, that is equivalent to the anomalous/rejected objects database 354 of FIG. 9. The IRQA scheduler 368 controls the performance of the application. The scheduler 368 obtains the jobs list 334 of FIG. 9 and in accordance with job execution parameters stored therein loads and activates the application. The detailed structure and the number and type of parameters stored in the job list were described herein above in association with FIG. 7. The job type parameter determines which of the stages of the application will be executed. If the job type parameter includes a code that indicates that the execution should include the scanning of the network scan and the extraction of computers from the network then the second stage of the application is executed. The computer extractor 374 scans the network 372 and extracts the computers constituting the network The computer level analyzer 382 obtains the list of the extracted computers, obtains via the path 368 the parameters from the EDPP 360 of FIG. 9 that were generated in the first stage of the execution and performs a computer level analysis of the EDPP data versus the computer list. The analysis involves a three-way comparison of the information provided by the data protection server index, the information obtained from the EDPP table, and computer data extracted from the network. The results could include a list of anomalous and/or rejected objects on the computer level. In a non-limiting exemplary scenario a situation could arise where a specific computer-level object is identified in the computer network while, no correlated operative data protection rule is located in the EDPP table. According to the situation, it is determined by the analyzer that an inconsistency was detected and consequently an anomalous object is generated. The situation described in the above-mentioned exemplary scenario could be reversed such that a computer-level object specific valid data protection rule are detected while the specific computer-level object is missing from the network. Accordingly to the situation, it is determined by the analyzer that an inconsistency exists and therefore indicated as such. Furthermore, the analyzer utilizes the data protection server index in order to validate full correlation with the EDPP table and with the computer network regarding the computer-level object. In another non-limiting example, if the IRQA application is unable to recognize the format of an object found in the network, and therefore cannot handle the object, then as a result the analysis generates a rejected object. The results of the analysis are sent to and stored on the anomalous/rejected objects database 354. The data protection server index extractor 378 obtains the data protection server rules from the data protection server 376 and obtains the EDPP parameters from the EDPP 360 of FIG. 9 that was generated in the first stage of the execution. The EDPP vs. data protection server index analyzer 380 compares the data protection server index to the EDPP parameters and stores the result of analysis on the anomalous/rejected object database 354. The database 354 is accessible via specifically submitted queries concerning the results of the computer level analysis and the EDPP vs. data protection server index analysis. The queries generate specific views and report that allow the users of the apparatus to examine the results.

The configuration, the constituent elements and the functionality thereof described herein above are exemplary only and non-limiting. In other preferred embodiments of the present invention the configuration could be modified, one or more elements could be added, some elements could be combined while yet other elements could be eliminated altogether. The functionality of the elements could also differ. The data pathways linking the elements could be further modified.

Figure 11:
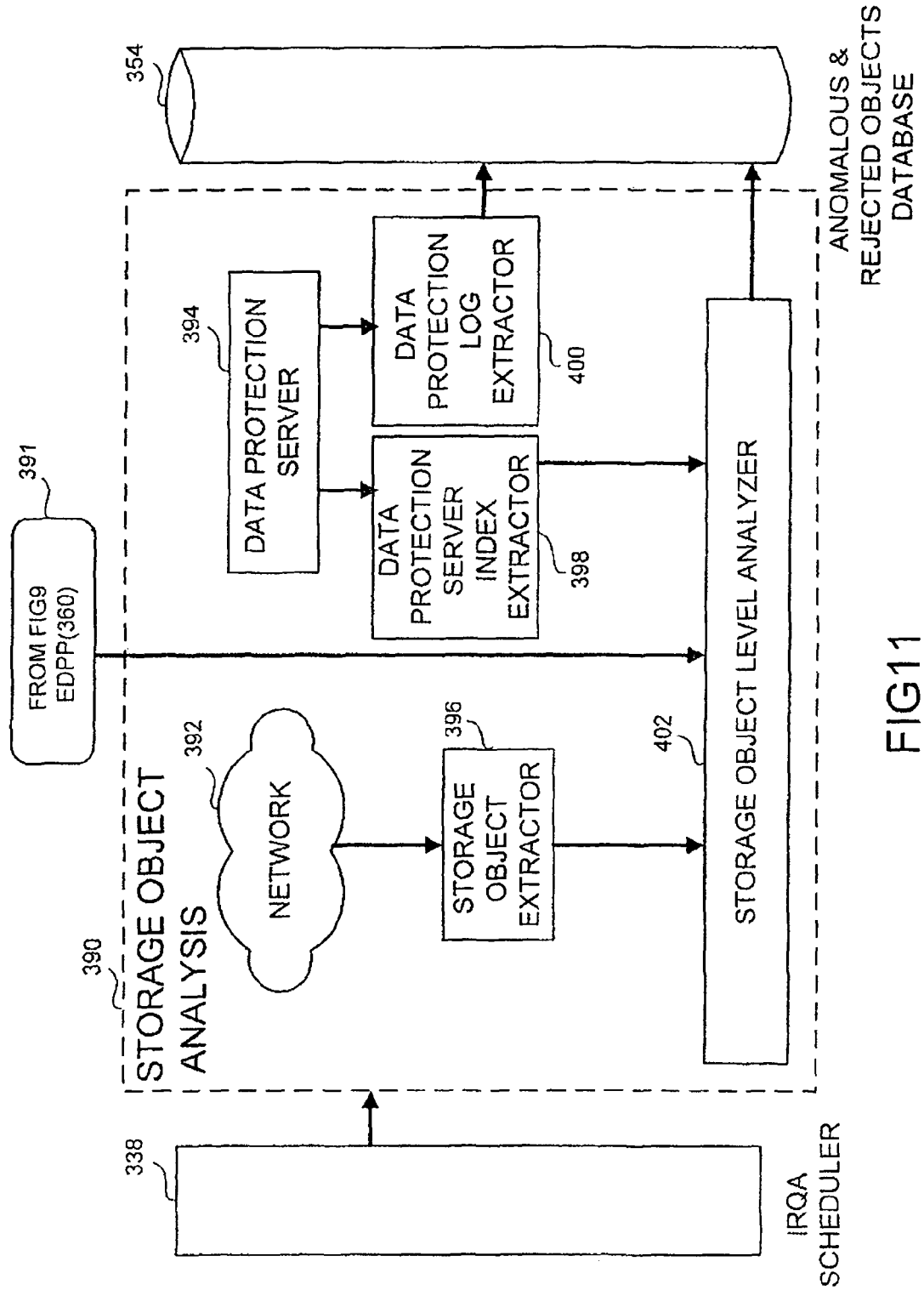

Referring now to FIG. 11 that illustrates the configuration of the proposed apparatus and system that is operative in the performance of the third executable stage of the IRQA application. The third stage of the IRQA application is the Storage Object Analysis 390. The function of stage 390 is to scan the network to enable the extraction and the collection of the storage objects from the network, to extract the data protection server index, and to analyze the list of extracted storage objects and the data protection server index versus the EDPP generated in the first stage. The analysis involves a three-way comparison of the information provided by the data protection server index, the information obtained from the EDPP table, and the list of storage objects extracted from the network. The results could include a list of anomalous and/or rejected objects on the storage object level. Several exemplary scenarios concerning non-reliable data protection results could be contemplated. In accordance with the preferred embodiment of the invention such occurrences will be operative in the generation of anomalous/rejected objects. The following non-limiting examples listed and described herein under in simplified manner regard such scenarios. a) A specific storage object was identified in the network, the data protection rule data indicate that the specific identified storage object is a candidate for backup; however, the information extracted from the data protection server index is not coherent with the relevant data protection rule or the network status of the storage object. b) A storage object was updated in the network prior to a planned data protection process defined by the rules of the EDPP table. However, the information from the data protection server index following the performance of the data protection process is either does not include the specific object or is not consistent with the object's characteristics. The inconsistency could be indicated either by the size of the object or the latest update date. c) A storage object is defined in the EDPP table but could not be located in the network. d) A storage object is identified in the network but no object-specific information is detected in the EDPP table. The results of all the above non-limiting examples are the generation of an anomalous object. In a further non-limiting example, if the IRQA application is unable to recognize the format of a storage object located in the network, and therefore cannot handle the storage object, then the analysis generates a rejected object. The configuration described on FIG. 11 includes the IRQA scheduler 338 that is equivalent to the IRQA scheduler 334 of FIG. 9, a computer network 392, a storage object extractor 396, a data protection server 394, a data protection server index extractor 398, a storage object level analyzer 402, a data protection log extractor 400, and a anomalous/rejected objects database 354, that is equivalent to the anomalous/rejected objects database 354 of FIG. 9. The IRQA scheduler 338 controls the performance of the application. The scheduler 338 obtains the jobs list 334 of FIG. 9 and in accordance with job execution parameters stored therein loads and activates the application. The detailed structure and the number and type of parameters stored in the job list were described herein above in association with FIG. 7. The job type parameter determines which of the stages of the application will be executed. If the job type parameter includes a code that indicates that the execution should include the scanning of the network and the extraction of storage objects from the network then the third stage of the application is executed. The storage object extractor 396 scans the network 392 and extracts the storage objects from the network 392. The data protection server index extractor 398 obtains the data protection index from the data protection server 394. The storage object level analyzer 402 obtains the list of the extracted storage objects from the storage object extractor 396, obtains the data protection index from the data protection server index extractor 398, obtains via the path 391 the parameters from the EDPP 360 of FIG. 1 that were generated in the first stage of the execution and performs a storage object level analysis of the EDPP data versus the extracted storage objects list. The results of the analysis is sent to and stored on the anomalous/rejected objects database 354. The storage object level analyzer further performs generic recovery logic analysis. The generic recovery logic is an additional analysis that can be configured on a set of storage objects. The recovery logic could be configured to check that a set of storage objects were protected in a specific manner or in a specific mode. The recovery logic is defined on a storage object, application backup type and level. The data protection log extractor 400 obtains the data protection logs from the data protection server 394 and stores the data protection logs on the anomalous/rejected database 354. The database 354 is accessible via specifically submitted queries concerning the results of the storage object level analysis and the data protection logs. The queries generate specific views and report that allow the users of the apparatus to examine the results of the analysis and to examine the data protection logs.

The configuration, the constituent elements and the functionality thereof described herein above are exemplary only and non-limiting. In other preferred embodiments of the present invention the configuration could be modified, one or more elements could be added, and some elements could be combined while yet other elements could be eliminated altogether. The functionality of the elements could also differ. The data pathways linking the elements could be further modified.

Figure 12:
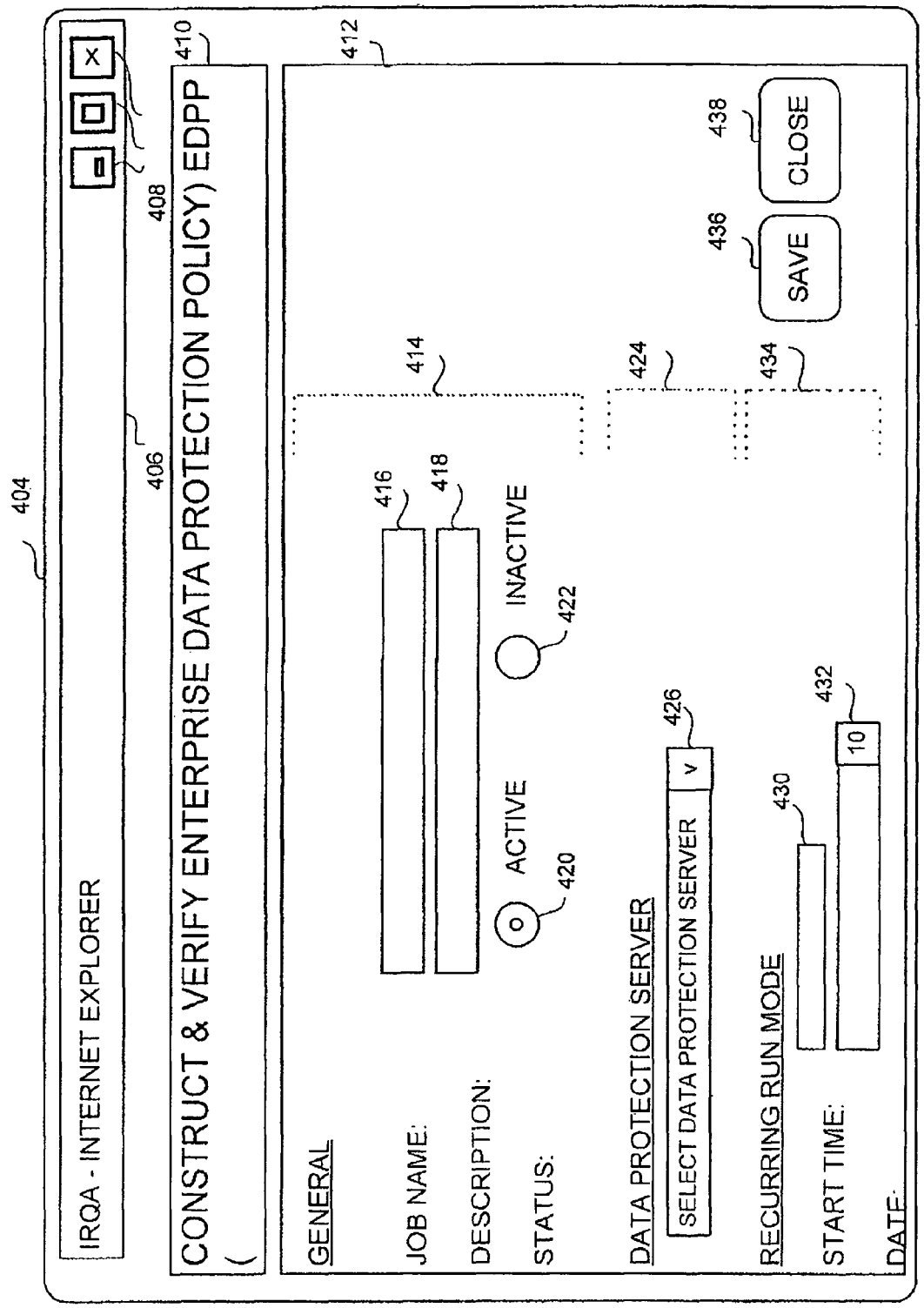

Referring now to FIG. 12 in the preferred embodiment of the invention, the user communicates with the IRQA apparatus via a display device utilizing a graphical user interface (GUI). In other preferred embodiments of the invention the user could interact with the display in a command line mode, a voice activation mode, and the like. The drawing under discussion shows an exemplary display operative in the submission of an IRQA job by a user for the execution of the first stage of the application. The graphical structure 404 is displayed on the display device and enables interaction with the user via various standard GUI components, such as display sub-screens, control buttons, text boxes, pull-down lists, radio buttons, menus (not shown), and the like. Structure 404 includes an application name display sub-screen 406, a set of standard screen display option control buttons 408, an application stage name display sub-screen 410, and a main display and input sub-screen 412. Sub-screen 412 includes a general display and input area 414, a data protection server display and input area 424, a recurring run mode display and input area 434, a save control button 436, and a close control button 438. General area 414 includes a job name text box 416, a job description text box 418 and a set of status radio buttons, such as active button 420 and inactive radio button 422. Data protection server area 424 includes a data protection server selection pull-down list 426. Recurring mode area 434 includes a job starting time text box 430, and an execution date selection pull down list 432. In order to generate an IRQA job the user activates the screen 404 via a higher-level screen or menu item (not shown). Next the user interacts with the screen 404 by inserting texts in the text boxes via a keyboard, selecting items from the pull-down lists via a pointing device, and activating the control buttons via the pointing device. Note should be taken that the screen 404 could be used for the modification or for the display of a previously submitted IRQA job. As shown within the application stage name display sub-screen 410 the screen is operative in the generation and optional modification of an IRQA job operative in the construction and verification of the enterprise data protection policy. In order to generate the job the user would perform a series of pre-defined actions during the interaction with the screen 404. First, the job name is determined and typed into the job name text box 416. Then the job description is typed into the description text box 418. The data protection server is selected by the selection of an item from the pull-down list box 426. If the user desires to activate the job in a recurrent manner then the required starting time of the job is inserted into the start time text box 430 and the suitable date is selected from the date pull-down list box 432. The status radio buttons 420, 422 are utilized for determining whether a specific job is available or not available for execution. In order to finalize the generation of the job the save control button 436 is activated via the operation of the pointing device. Subsequent to the activation of the save control button 436 a new job is created in the IRQA job list that includes all the required parameters for the execution of the job. The IRQA scheduler periodically obtains the job list, and examines the list to determine whether there is a job with the suitable time-sensitive execution parameters. When a job is found with the appropriate parameters the IRQA scheduler loads and executes the application and the suitable application stage is performed.

The visual structure of the screen, the constituent graphical elements of the screen and the functionality thereof described herein above are exemplary only and non-limiting. In other preferred embodiments of the present invention the screen could be substantially modified, one or more graphical structures could be added, some structures could be combined while yet other structures could be eliminated altogether. The functionality of the structures could also differ. Graphical structures could be replaced by alternative structures. Information displayed on the screen could differ as well among different embodiments.

Figure 13:
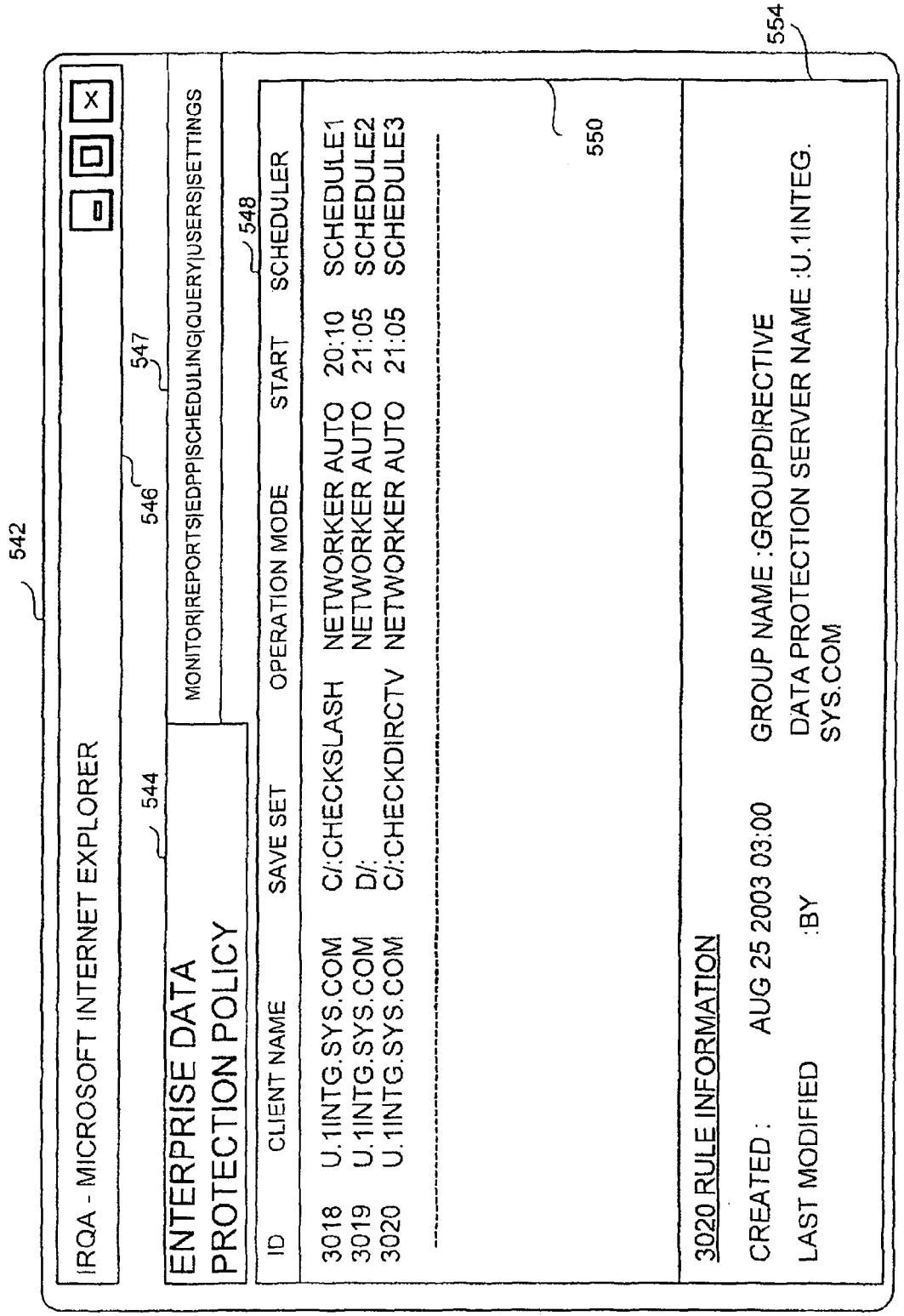

Referring now to FIG. 13 that shows an exemplary display screen that presents a view generated in response to a specific IRQA query submitted by a user. The graphical structure 542 is displayed on the display device and provides the user with a structured view of the information representing the results of the query. Screen 542 includes an application name display sub-screen 546, a set of standard screen display option control buttons, an view name display sub-screen 544, an operational option sub-screen 547, a field names display area 548, a primary display sub-screen 550, and a secondary display sub-screen 554. As shown in the view name display sub-screen 554 the view was generated in response to a query concerning the enterprise data protection policy. The functionality, structure and the individual fields of the EDPP were described in detail herein above. The primary display sub-screen 550 includes a list of structured lines where each line corresponds to a record in the EDPP. The lines include a pre-determined and selective set of record fields, such as data protection rule identification, client name, save set, operation mode, starting time, and schedule type. The secondary sub-screen 554 display rule-specific information associated with a user-selected line in the primary display sub-screen 550. The operational option sub-screen 547 allows the user to load and view other display screens or display and input for the display of, for example, users list, for the viewing of a query, a report, and the like.

The visual structure of the screen, the constituent graphical elements of the screen and the functionality thereof described herein above are exemplary only and non-limiting. In other preferred embodiments of the present invention the screen could be substantially modified, one or more graphical structures could be added, some structures could be combined while yet other structures could be eliminated altogether. The functionality of the structures could also differ. Graphical structures could be replaced by alternative structures. Information displayed on the screen could differ as well among different embodiments.

Referring now to FIG. 14 that shows an exemplary display screen that presents a view generated in response to a specific IRQA query submitted by a user. The graphical structure 562 is displayed on the display device and provides the user with a structured view of the information representing the results of the query. Screen 562 includes an application name display sub-screen 564, a set of standard screen display option control buttons, a view name display sub-screen 566, a summary sub-screen 567, a field names display area 568, and a main display sub-screen 570. As shown in the view name display sub-screen 566 the view was generated in response to a query concerning the anomalous/rejected storage objects detected during the execution of the IRQA application and stored in the anomalous/rejected objects database. The functionality, structure and the individual fields of the anomalous/rejected objects table were described in detail herein above. The main display sub-screen 570 includes a list of structured lines where each line corresponds to a record in the anomalous/rejected objects table. The lines include a predetermined and selective set of record fields, such as object name, maximum duration, maximum number of failures, highest severity indication, and the reason for the failure. The summery sub-screen 567 allows the user to view the total number of the anomalous/rejected objects, and the like.

The visual structure of the screen, the constituent graphical elements of the screen and the functionality thereof described herein above are exemplary only and non-limiting. In other preferred embodiments of the present invention the screen could be substantially modified, one or more graphical structures could be added, some structures could be combined while yet other structures could be eliminated altogether. The functionality of the structures could also differ, graphical structures could be replaced by alternative structures, and data displayed on the screen could differ among different embodiments.

Figure 15:
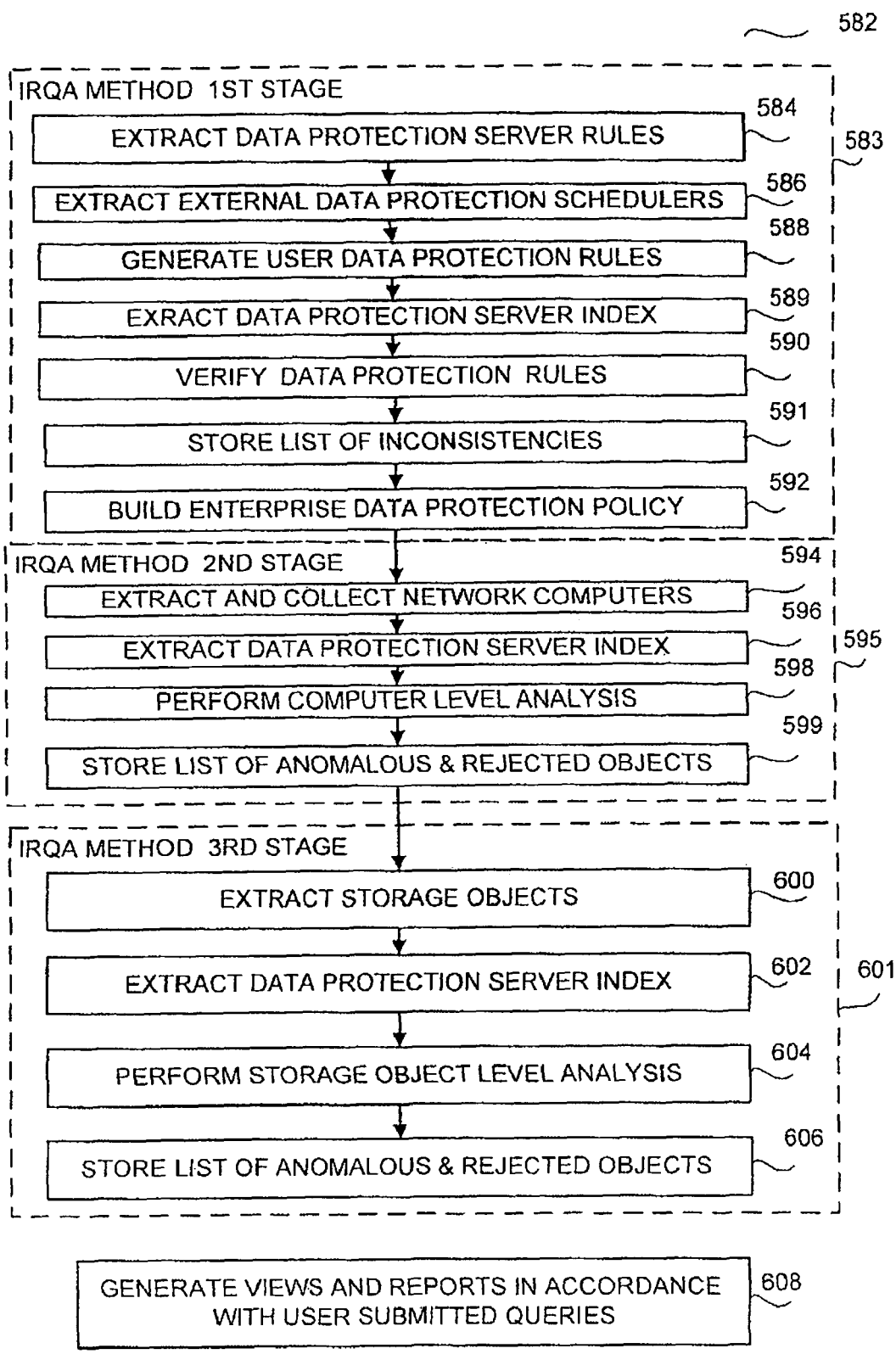
FIG. 15 is a simplified high-level flow chart illustrating the operation of the proposed method, in accordance with a preferred embodiment of the present invention.

Referring now to FIG. 15 that illustrates the method of operation of the proposed apparatus via the utilization of a simplified flow chart. The operation is generally divided into three stages where the stages could be executed either in a separate, selectively successive or fully successive manner. A user submitting a request for execution via an IRQA job determines the mode of execution. The functionality, structure, field definitions and the method of generation of a job were described herein above with association with the relevant drawings. The function of the first stage of the operation 583 is to build an enterprise data protection policy. The policy is a central, integrated repository of data protection rules extracted from the diverse data protection rules associated with the performance of a data protection process. Thus, at step 584 the data protection server rules are extracted from a data protection server, at step 586, the external data protection schedules are extracted from external data protection scheduler, at step 589 the data protection information is extracted from the data protection server index, and at step 588 the user data protection rules are generated. At step 590 the collected data protection rules are verified and at step 591 a list of inconsistencies is generated and stored. The first stage 583 is completed at step 592 where an enterprise data protection policy is constructed and stored into a specific EDPP file. The functionality, structure, and field definitions of the EDPP file were described herein above in association with the relevant drawings. The EDPP file is generally used as input to the analyzer modules.

Still referring to FIG. 15 the function of the second stage of the operation 595 is to extract the computers from the network and the perform a three-way analysis on the computer level where the analysis involves the EDPP file built in the first stage 583, the extracted computers, and the data protection server index. The analysis will provide a list of anomalous/rejected objects on the computer level. Thus, at step 594 the network is scanned and the computers linked to the network are extracted. At step 596 the data protection server index is obtained from the data protection server, at step 598 a computer level analysis is performed, and at step 599 the result of the analysis regarding anomalous/rejected computer level objects is stored on the anomalous/rejected database. The analysis performed in 598 detects inconsistencies in the actual network computers through a comparison with the data protection server index and the EDPP file generated in stage 583. In the same manner, the analysis is performed in respect of network computers that cannot be recovered due to technical problems in network hardware, and the like.

Still referring to FIG. 15 the function of the third stage of the operation 601 is to extract the storage objects from the network and the perform a three-way analysis on the storage object level where the analysis involves the EDPP file built in the first stage 583, the extracted storage objects, and the data protection server index. The analysis will provide a list of anomalous/rejected objects on the computer level. Thus, at step 600 the network is scanned and the storage objects associated with the computers linked to the network are extracted. At step 602 the data protection server index is obtained from the data protection server, at step 604 storage object level analysis is performed, and at step 606 a list of anomalous or rejected objects is generated and stored in the anomalous/rejected objects database. The analysis performed in 604 detects erroneous data protection configuration in the data protection server index or the EDPP. Such errors typically cause storage objects to be left out of the data protection process or be backed up improperly. Thus, a comparison between the data protection server index and the storage object level is performed such that inconsistencies would be identified as anomalous or rejected objects. Likewise the analysis is performed in respect of network storage objects that cannot be recovered do to technical problems in network hardware, or the like. The analysis also determines which network storage objects cannot be recovered according to the existing data protection rules set by the EDPP. The three-way comparison provides for the comparison of at least three sources: the EDPP, the data protection server index and the network storage objects. Such comparison enables the efficient detection of previously non-detected and non-recoverable objects. The three-way comparison identifies storage objects that do not exist on the data protection rules by comparing the actual network objects with the consistent data protection rules and schedules. This comparison is drilled down and is performed on the actual network object level to include computers, storage object systems, directories and storage objects. Thus, storage object systems, directories and even computers installed after a set of data protection server rules were created would be discovered by the analysis of the present invention and allow efficient and complete data protection and recovery of such objects. In addition, the comparison is performed in relation to storage objects such as data protection tapes and hardware as well. Network storage objects backed up with particular attributes would be noted as backed up with such attributes in the data protection server index; later attribute changes to such a storage object would be detected by the analysis step through performing an attribute comparison. Such attributes can include the storage object size, event dates the like. Such inconsistencies may indicate that the said storage object will not be recoverable thus a notice to the user to perform an additional data protection will be provided. In addition, the analysis step examines the recovery plan time for objects in the system. In addition, bugs arising from the data protection software can also be detected by performing examining the network objects log files to determine abnormal occurrences during data protection schedule times. For example, if the data protection server boots up during the data protection operation and restarts after the boot process, the event may not be logged by the data protection software logs but will be reflected in the data protection server index and will be detected during the analysis step. Likewise, ordinary data protection process failures can be detected and alerted, such as the failure to provide data protection tapes (which will not be reported), inadequate weekend or holiday data protection processes and the like. The primary feature of the analysis step is the comparison between the EDPP, the data protection server index and the network objects such that a substantial part or nearly all of the network objects are backed up in such manner that allows their recovery when needed. At step 608 that is detached from the different stages, that is could be performed at any of the stages, views and reports are generated in response to the queries submitted by a user where the views and the reports regard the inconsistencies and the anomalous/rejected object detected, as well as various operational aspects of the apparatus.

The method of operation, the stages of operation, and the operational steps described herein above are exemplary only and non-limiting. In other preferred embodiments of the present invention the method could be modified, one or more steps and/or method stages could be added, and some steps could be combined while yet other steps could be eliminated altogether. The operations represented by the various steps could differ, the sequence of steps could be modified, and one or more steps could be replaced by other alternative steps in other preferred embodiments of the invention.

The proposed apparatus and method described in detail herein above provides for extensive analysis and mapping of the entire range of enterprise data protection rules and data protection policies, provides for identification of rule inconsistencies that may cause incomplete data recovery, detection of network storage objects that can not be recovered in general, and detection of network storage objects that can not be recovered according to the data protection rules set by the integrated enterprise data protection policy.

Next several non-limiting examples will be provided in addition to the examples provided above, to demonstrate better the benefits, the power and the added value of the proposed apparatus and method. The apparatus and method are capable of identifying a storage object that entirely misses data protection schedule. The identification is done on the computer level as well as more significantly, on the level of the file-system and the directory. In the following scenario a file-system C:/ was defined explicitly in the data protection server policy. Then a sibling file-system D:/ is created in the system. However, the file-system D:/ is not defined in the data protection server. The proposed apparatus and method will detect the above condition and the file-system D:/ will be shown in analysis results as an anomalous/rejected object.

In a further non-limiting example that demonstrates the advantages of the proposed system and method the following scenario is considered. The entire last data protection process (either a full or an incremental backup) of the storage objects is destroyed that is the data protection storage device, such as a tape unit, was re-labeled. Then the IRQA application is activated prior to the next data protection process. Consequently the IRQA analysis will detect, in accordance with the client/save-set definition, all the relevant storage objects as anomalous/rejected and thereby indicating severe problems with the data protection server index.

A storage object may be backed up and indicated as backed up in the data protection server index with specific attributes. When one or more storage attributes, such as size for example, in the data protection server index differ from the genuine storage object attributes the proposed apparatus and method will detect the discrepancy and will issue an alert regarding a potential storage object attribute problem.

A data protection process was not fully completed for a given network population as a result of operating errors. Erroneous operations typically involve human errors, such as dysfunctional tape handling, and the like. The IRQA application will detect the relevant storage objects as anomalous/rejected objects.

In an additional error scenario the data protection server is rebooted (intentionally or mistakenly) during the data protection process. The event may not be reflected in the data protection log files as a result of a data protection software bug. Even if the event is registered in the data protection server log the operators or the data protection administrators do not always meticulously perform the manual review of the log. The IRQA application could analyze the data protection log files in association with the data protection server index, the data protection rules, and the data protection schedules and could assist considerably in the detection of the event and/or the software bug. In other preferred embodiments of the present invention the Information Recovery Quality Assessment (IRQA) apparatus and method could be referred to alternatively as the Information Recovery Assurance Manager (IRAM) or in other like terms or trade names.

It will be appreciated by persons skilled in the art that the present invention is not limited to what has been particularly shown and described hereinabove. Rather the scope of the present invention is defined only by the claims, which follow.

We claim:

1. In a computer network including an at least one computing device, an at least one storage object, an at least one data protection server device, and an at least one data protection storage device, an apparatus for an assessment of the quality of a recovery process, the apparatus comprising the elements of:
 a data protection policy builder component to create at least one data protection rule associated with an organization operating the computer network, the at least one data protection rule being used to control a backup process and indicating that a first storage object is a candidate for backup, the at least one data protection rule comprising a data protection rules repository;
 a network computer-level analyzer component to compare an at least one network computer with an at least one data protection input parameter of the at least one data protection rule;
 a network storage object-level analyzer component to compare an at least one network storage object with the at least one data protection input parameter of the at least one data protection rule, and with data protection result output data of at least one data protection server index, wherein the at least one network storage object is a previously backed up storage object and the network storage object-level analyzer component performs recovery logic analysis to validate ability to subsequently restore the at least one network storage object, wherein the recovery logic analysis uses a plurality of control fields including a first control field having a value indicating whether additional storage objects or a dependency component are backed up with said at least one network storage object and a second control field having a value indicating whether said at least one network storage object is down or in a backup mode when backed up, wherein said first control field is one of a plurality of dependency type values including a first dependency type value indicating that said at least one network storage object is backed up together with a following identified dependency component a second dependency type value indicating that said at least one network storage object is backed up without a following identified dependency component, and a third dependency type value indicating that additional storage objects are backed up when said at least one network storage object is backed up; and
 a rejected objects identifier component to identify anomalous or rejected objects in accordance with results generated by the data protection policy builder component or by the network computer-level analyzer component or by the network storage object-level analyzer component, wherein said anomalous or rejected objects identified by said rejected objects identifier component include objects omitted from a data protection process or which have been backed up improperly.

2. The apparatus of claim 1 wherein the anomalous or rejected objects are storage objects that cannot be recovered through the process of data protection or storage objects that cannot be recovered according to the at least one data protection rule or storage objects that are inconsistent with the at least one data protection rule.

3. The apparatus of claim 1 wherein the data protection policy builder component performs an analysis on the at least one data protection rule.

4. The apparatus of claim 1 further comprising:
 a data protection policy table to store the at least one data protection rule; and a rejected objects table to store the at least one identified anomalous or rejected object.

5. The apparatus of claim 1 further comprising a rejected objects analyzer component to provide information associated with the at least one anomalous or the at least one rejected object in response to an at least one query submitted by an at least one user.

6. The apparatus of claim 1 further'comprises the elements of:
data protection server index extractor component to obtain data protection result data from the at least one data protection server;
a network computer extractor component to scan the network and generate a list including an at least one network computer;
a network storage object extractor component to retrieve the computer network and generate a list including an, at least one network storage object;
a data protection server rules extractor component to obtain the at least one data protection rule associated with the at least one data protection server.

7. The apparatus of claim 6 further comprising:
an external data protection scheduler extractor component to obtain the at least one data protection schedule associated with the at least one data protection rule; and
a user data protection rules generator component to create an at least one user-defined data protection rule.

8. The apparatus of claim 1 further comprises the elements of:
a data protection log extractor component to obtain data protection log data generated by the at least one data protection server during the performance of a data protection process;
a views generator component to create an at least one view of the anomalous or rejected object or data protection rule inconsistencies or irrecoverable storage objects or storage objects that are not consistent with a data protection policy, in response to an at least one query submitted by an at least one user.

9. The apparatus of claim 8 further comprising:
a report generator component to create and format at least one report based on the at least one view; and
a job scheduler component to manage the execution of an at least one job defined for the operation of the apparatus.

10. The apparatus of claim 1 further comprises the elements of:
a network computer table to store at least one list of an at least one aspect of the at least one network computer;
a network storage object table to store at least one list of an at least one aspect of the at least one network storage object.

11. The apparatus of claim 1 further comprises the elements of:
a user data protection rule table to store the data protection rules defined by an at least one user of the apparatus;
a user table to store a list of an at least one aspect of the at least one user;
a data protection server index to store data protection results output data generated during the execution of a data protection process managed and controlled by the at least one data protection server;
a queries table to store a list of an at least one query; and
a user queries table to store a list of the at least one query submitted by the at least one user.

12. The apparatus of claim 1 wherein the data protection rules repository comprises the elements of:

a data protection rule identifier that identifies uniquely a data protection rule;
a data protection rule type;
a client identifier;
a data protection server identifier to identify a data protection server associated with the data protection rule a save set object;
a data protection group name;
a data protection group start time;
a group operation mode;
a data protection schedule name;
a schedule period;
a schedule day; and
a creation date.

13. The apparatus of claim 12 further comprising a views generator component to create an at least one view of the data protection rules repository.

14. The apparatus of claim 4, wherein the rejected objects table comprises the elements of:
a data protection server identifier to identify the data protection server responsible for the performance of a data protection process during which an anomaly associated with the rejected object was generated;
a storage object name to identify the rejected storage object;
a computer name to identify the rejected computer or identify the computer associated with the rejected storage object;
a storage object system identifier;
a pathname indicating the location of the rejected object;
an, object size to indicate the physical size of the rejected object;
a reason for failure code to indicate the type of failure via which the rejected object was generated;
a process identifier;
a date identifier; and
a data protection rule identifier.

15. The apparatus of claim 1 wherein the storage object is an object existing within the computer network and is a candidate for backup.

16. The apparatus of claim 1 wherein the computing device is a client computing device or a server computing device.

17. The apparatus of claim 15 wherein a storage object is one of the following: a file;
a directory; a file system; a storage device; a virtual storage device; a client computer; and a server computer.

18. In a computer network including an at least one computing device, an at least one storage object, an at least one data protection server device, and an at least one data protection storage device, a method for an assessment of the quality of a recovery process, the method comprising the steps of:
building a combined data protection policy table by obtaining and inserting into the table the at least one data protection rule, the at least one data protection rule being used to control a backup process and indicating that a first storage object is a candidate far backup;
performing a network computer-level analysis by scanning the computer network, locating an at least one network computer linked to the network, obtaining network computer-specific data to identify the at least one network computer, and comparing the network computer-specific data with the content of the combined data protection policy table;
performing a network storage object-level analysis by locating an at least one network storage object associated with the at least one network computer linked to the computer network, obtaining storage object-specific data that identifies the at least one network storage object, and comparing the storage object-specific data with the content of the combined data protection policy table, wherein the at least one network storage object is a previously backed up storage object and the network storage object-level analysis further includes performing recovery logic analysis to validate ability to subsequently restore the at least one network storage object, wherein the recovery logic analysis uses a plurality of control fields including a first control field having a value indicating whether additional storage objects or a dependency component arc backed up with said at least one network storage object and a second control field having a value indicating whether said at least one network storage object is down or in a backup mode when backed up, wherein said first control field is one of a plurality of dependency type values including a first dependency type value indicating that said at least one network storage object is backed up together with a following identified dependency component, a second dependency type value indicating that said at least one network storage object is backed up without a following identified dependency component, and a third dependency type value indicating that additional storage objects are backed'up when said at least one network storage object is backed up; and comparing an at least one first data protection input parameters with the at least one data protection rule or with an at least one second data protection input parameters to identify inconsistencies or to identify storage objects that cannot be recovered, wherein said storage objects that cannot be recovered include objects which have been backed up improperly or which have been omitted from a data protection process.

19. The method of claim 18 wherein the computer-specific data comprises information about a computer linked to the computer network.

20. The method of claim 18 wherein the object-specific data comprises information about an object located within a computer linked to the computer network.

21. The method of claim 18 wherein the step of comparing further comprises extracting a data protection server index from an at least one data protection server and comparing the data protection server index with the contents of the at least one data protection rule, with the at least one network storage object, and with the at least one network computer-specific data.

22. The method of claim 18 further comprising the steps of:
storing on a storage device results of the at least one data protection rule comparison, results of the network computer-level analysis, and results of the network storage object-level analysis.

23. The method of claim 18 further comprises the step of generating an at least one user data protection rule.

24. The method of claim 18 further comprises the step of extracting an at least one data protection server log.

25. The method of claim 18 further comprises generating an at least one view for or at least one report in response to an at least one query submitted by an at least one user comprising an at least one back rule or an at least one inconsistency or an at least one object that cannot be recovered.

26. The method of claim 18 wherein the combined data protection policy table comprises an at least one data protection rule associated with an organization operating the computer network.

27. The method of claim 18 wherein the network computer-level analysis includes comparison of results of an information about at least one network computer with data protection input parameters of an at least one data protection rule and with a data protection result, output data included in an at least one data protection server index.

28. The method of claim 18 wherein the network storage object-level analysis includes the comparison of information about the at least one network storage object with data protection input parameters of an at least one data protection rule and with a data protection result output data included in an at least one data protection server index.

29. The method of claim 18 wherein results of the network computer-level analysis and the network storage object-level analysis are anomalous objects or rejected objects.

30. The, method of claim 18 wherein an anomalous or rejected object is a storage object that cannot be recovered by a data protection process or a storage object that cannot be recovered by a data protection process defined by the at least one data protection, rule or a storage object is inconsistent with information comprising the at least one data protection rule or the data protection input parameters of the at least one data protection rule.

31. The method of claim 30 wherein the storage object, is an object existing within the computer network and is a candidate for backup.

32. The method of claim 18 wherein the data protection policy table comprises at least one data protection rule derived from an at least one data protection server derived from an at least one data protection computer program in the organization.

33. The method of claim 32 wherein the data protection policy table further comprises an at least one data protection rule derived from an at least one external data protection scheduler or an at least one data protection rule derived from an at least one user manual script or an at least one data protection rule derived from an at least one local directive or an at least one global directive.

34. The method of claim 18 wherein the data protection policy table comprises at least one data protection rule wherein each at least one data protection rule apply to at least one storage object associated with the computer network during a data protection process whereby a viewpoint of the data protection rules and policies in the organization are shown.

35. The method of claim 18 further comprises a recovery advisor module for enabling a user to formulate a recovery plan by displaying in a selective manner a list of recovery points for one or more specific storage objects or applications.

36. In a computer network including an at least one computing device, an at least one storage object, an at least one data protection server device, and an at least one data protection storage device, an apparatus for an assessment of the quality of a recovery process, the apparatus comprising the elements of:
a data protection policy builder component to create at least one data protection rule associated with an organization operating the computer network, the at least one data protection rule being used to control a backup process and indicating that a first storage object is a candidate for backup, the at least one data protection rule comprising a data protection rules repository;
a network computer-level analyzer component to compare an at least one network computer with an at least one data protection input parameter of the at least one data protection rule;
a network storage object-level analyzer component to compare an at least one network storage object with the at least one data protection input parameter of the at least one data protection rule, and with data protection result output data of at least one data protection server index, wherein the at least one network storage object is a previously backed up storage object and the network storage object-level analyzer component performs recovery logic analysis to validate ability to subsequently restore the at least one network storage object, wherein the recovery logic analysis uses a plurality of control fields including a first control field having a value indicating whether additional storage objects or a dependency component are backed up with said at least one network storage object'and a second control field having a value indicating whether said at least one network storage object is down or in a backup mode when backed up; and a rejected objects identifier component to identify anomalous or rejected objects in accordance with results generated by the data protection policy builder component or by the network computer-level analyzer component or by the network storage object-level analyzer component, wherein said anomalous or rejected objects identified by said rejected objects identifier component include objects omitted from a data protection process or which have been backed up improperly, wherein said first control field is one of a plurality of dependency type values including a first dependency type value indicating that said at least one network storage object is backed up together with a following identified dependency component, a second dependency type value indicating that said at least one network storage object is backed up without a following, identified dependency component, and a third dependency type value indicating that additional storage objects are backed up when said at least one network storage object is backed up, and wherein said second control field is one of a plurality of backup type values including a first backup type value indicating that said at least one network storage object is in said backup mode when backed up, a second backup type value indicating that said at least one network storage object is down when backed up, and a third backup type value indicating that said at least one network storage object is in any mode when backed up.

* * * * *